United States Patent
Imamura et al.

(10) Patent No.: US 8,164,674 B2
(45) Date of Patent: Apr. 24, 2012

(54) IMAGE FORMING OPTICAL SYSTEM AND ELECTRONIC IMAGE PICKUP APPARATUS EQUIPPED WITH SAME

(75) Inventors: Ayami Imamura, Hachioji (JP); Keigo Matsuo, Akiruno (JP)

(73) Assignee: Olympus Corporation, Tokyo (JP)

( * ) Notice: Subject to any disclaimer, the term of this patent is extended or adjusted under 35 U.S.C. 154(b) by 411 days.

(21) Appl. No.: 12/589,556

(22) Filed: Oct. 23, 2009

(65) Prior Publication Data
US 2010/0149404 A1 Jun. 17, 2010

(30) Foreign Application Priority Data
Oct. 28, 2008 (JP) .................................. 2008-276910

(51) Int. Cl.
  H04N 5/225 (2006.01)
  H04N 5/262 (2006.01)
  G02B 9/14 (2006.01)
  G02B 15/14 (2006.01)
(52) U.S. Cl. ...... 348/335; 359/785; 359/687; 348/240.3
(58) Field of Classification Search .............. 348/240.3, 348/335, 340; 359/684, 686, 687, 688, 689, 359/690, 785
See application file for complete search history.

(56) References Cited

U.S. PATENT DOCUMENTS

| 7,139,131 | B2 * | 11/2006 | Nanba et al. | 359/687 |
| 7,580,202 | B2 * | 8/2009 | Wada | 359/689 |
| 2010/0208321 | A1 * | 8/2010 | Matsuo | 359/207.6 |
| 2011/0222168 | A1 * | 9/2011 | Imamura | 359/687 |

FOREIGN PATENT DOCUMENTS

| JP | 11-258507 | 9/1999 |
| JP | 2007-072117 | 3/2007 |

* cited by examiner

*Primary Examiner* — David N Spector
(74) *Attorney, Agent, or Firm* — Kenyon & Kenyon LLP

(57) ABSTRACT

An image forming optical system characterized by comprising a positive first lens group, a negative second lens group, and third and subsequent lens groups having a positive composite refracting power, wherein the first lens group is composed of a cemented lens made up of one positive lens and one negative lens arranged in order from the object side, and the image forming optical system satisfies the following conditional expressions (1-1) and (2-1):

$$0.05 < T1g/Flt < 0.10 \quad (1\text{-}1)$$

$$0.50 < \theta gF < 0.75 \quad (2\text{-}1)$$

where $T1g$ is the thickness of the first lens group on the optical axis, $Flt$ is the focal length of the entire image forming optical system at the telephoto end, and $\theta gF$ is the partial dispersion ratio $(ng1-nF1)/(nF1-nC1)$ of the negative lens, where $nd1$, $nC1$, $nF1$, and $ng1$ are refractive indices of the negative lens respectively for the d-line, C-line, F-line, and g-line.

20 Claims, 23 Drawing Sheets

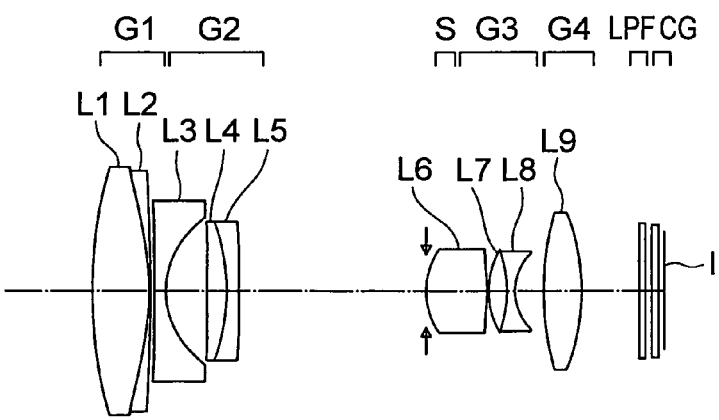
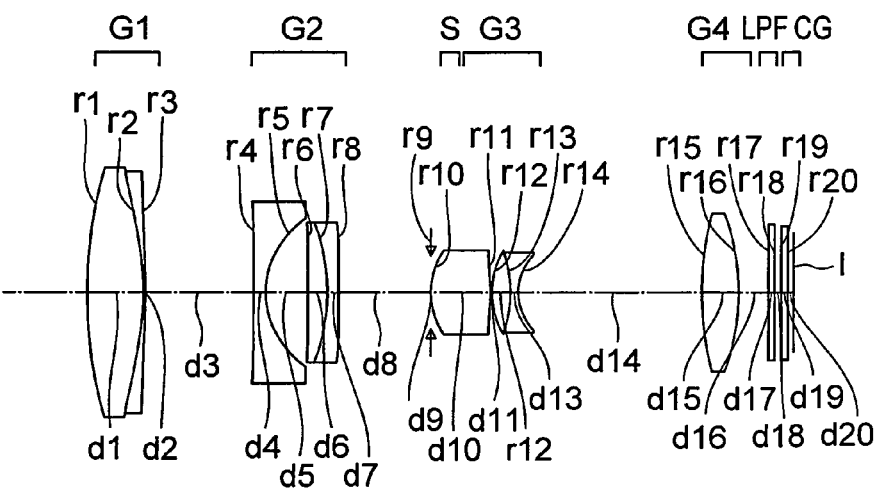
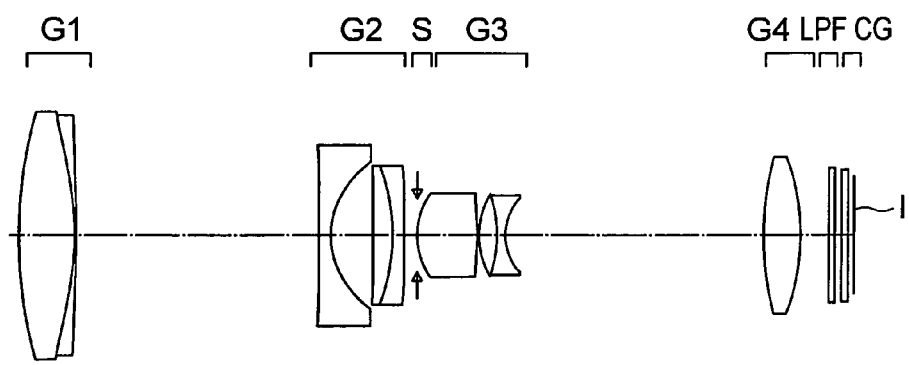

IMAGE FORMING OPTICAL SYSTEM AND ELECTRONIC IMAGE PICKUP APPARATUS EQUIPPED WITH SAME

CROSS-REFERENCE TO RELATED APPLICATION

The present application is based upon and claims the benefit of priority from the prior Japanese Patent Application No. 2008-276910 filed on Oct. 28, 2008; the entire contents of which are incorporated herein by reference.

BACKGROUND OF THE INVENTION

1. Field of the Invention

The present invention relates to an image forming optical system and an electronic image pickup apparatus equipped with the same.

2. Description of the Related Art

With the progress in the slimming of compact cameras in recent years, slimming of optical systems are required so that they can be accommodated in slim camera bodies. The optical system of compact cameras is collapsed and stored in the body after use. For this reason, the slimming of the camera body necessitates the slimming of the collapsed length of the optical system accordingly.

To enable the collapsing of an optical system, the lens frame of the optical system is divided into a plurality of tiers so that it can extend and collapse. In this case, if the collapsed length is to be made small, the length of each divisional tier of the lens frame is also to be made small. This leads to an increase in the number of tiers for collapsing. In consequence, the entire lens frame tends to be deformed by gravity when the optical system is extended, and decentering of the optical system tends to occur. In view of this, it is necessary to reduce the entire length of the optical system to thereby shorten the lengths of divisions of the lens frame and reduce the number of divisions.

To provide an optical system that meets the above requirements, it is particularly important to slim the optical system in the collapsed state and to reduce the entire length. Structures that focus on the slimming are described, for example, in Japanese Patent Application Laid-Open No. 11-258507 and Japanese Patent Application Laid-Open No. 2007-72117.

In the fourth, sixth, and seventh embodiments disclosed in Japanese Patent Application Laid-Open No. 11-258507, the first lens group is composed of a single lens element. In general, in particular a reduction in the entire length of an optical system leads to an increase in the refracting power of the first lens group. This causes large chromatic aberrations such as axial chromatic aberration and chromatic aberration of magnification, leading to a deterioration in the image quality.

To suppress chromatic aberrations, at least two lenses (i.e. a positive lens and a negative lens) need to be used. However, if two lenses are used, the thickness of the lens system will become thicker than in the case of a single lens system. In view of this, the two lenses are cemented together in many cases so as to make the thickness as small as possible.

Such an optical system is disclosed, for example, in Japanese Patent Application Laid-Open No. 2007-72117. In this optical system, the first lens group is composed of a cemented lens made up of a positive lens and a negative lens arranged in order from the object side. Conventionally, cementing of the cemented lens is performed after machining each of the lens elements. Therefore, the two lenses in such a cemented lens each need to have a certain degree of thickness to allow machining. For this reason, the thickness of the cemented lens and the thickness of the optical system in the collapsed state tend to become thick.

Furthermore, such cemented lenses tend to be heavy in weight. The amount of movement of the first lens group in optical systems having a variable entire length is generally large. The first lens group that is heavy in weight necessitates a large drive system (such as a motor) and a large overall size of the camera.

SUMMARY OF THE INVENTION

According to a first aspect of the present invention, there can be provided An image forming optical system characterized by comprising a positive first lens group, a negative second lens group, and an image side lens group disposed on the image side of the negative second lens group, wherein the image side lens group has a positive composite refracting power, the first lens group is composed of a cemented lens made up of one positive lens and one negative lens arranged in order from the object side, and the image forming optical system satisfies the following conditional expressions (1-1) and (2-1):

$$0.05 < T1g/Flt < 0.10 \quad (1\text{-}1)$$

$$0.50 < \theta gF < 0.75 \quad (2\text{-}1)$$

where $T1g$ is the thickness of the first lens group on the optical axis, $Flt$ is the focal length of the entire image forming optical system at the telephoto end, and $\theta gF$ is the partial dispersion ratio $(ng1-nF1)/(nF1-nC1)$ of the negative lens, where $nC1$, $nF1$, $ng1$ are the refractive indices of the negative lens respectively for the C-line, F-line, and g-line.

According to a preferred mode of the present invention, it is desirable that the image forming optical system satisfy the following conditional expressions (1-2) and (2-2):

$$0.07 < T1g/Flt < 0.09 \quad (1\text{-}2)$$

$$0.52 < \theta gF < 0.73 \quad (2\text{-}2).$$

According to a preferred mode of the present invention, it is desirable that the image forming optical system satisfy the following conditional expressions (3-1) and (4-1):

$$1.50 < nd1 < 1.70 \quad (3\text{-}1)$$

$$16 < vd1 < 28 \quad (4\text{-}1)$$

where $nd1$ is the refractive index of the negative lens for the d-line, and $vd1$ is the Abbe number $(nd1-1)/(nF1-nC1)$ of the negative lens, where $nC1$, $nF1$, and $ng1$ are the refractive indices of the negative lens respectively for the C-line, F-line, and g-line.

According to a preferred mode of the present invention, it is desirable that the image forming optical system satisfy the following conditional expressions (3-2) and (4-2):

$$1.57 < nd1 < 1.67 \quad (3\text{-}2)$$

$$19 < vd1 < 26 \quad (4\text{-}2).$$

According to a preferred mode of the present invention, it is desirable that the image forming optical system satisfy the following conditional expressions (3-1), (5-1), and (6-1):

$$1.50 < nd1 < 1.70 \quad (3\text{-}1)$$

$$0.54 < \theta gF < 0.72 \quad (5\text{-}1)$$

$$0.51 < \theta hg < 0.68 \quad (6\text{-}1)$$

where nd1 is the refractive index of the negative lens for the d-line, and θgF is the partial dispersion ratio (ng1−nF1)/(nF1−nC1) of the negative lens, θhg is the partial dispersion ratio (nh1−ng1)/(nF1−nC1) of the negative lens, where nF1, nC1, nh1, and ng1 are the refractive indices of the negative lens respectively for the F-line, C-line, h-line, and g-line.

According to a preferred mode of the present invention, it is desirable that the image forming optical system satisfy the following conditional expressions (3-1), (5-2), and (6-2):

$$1.50 < nd1 < 1.70 \quad (3\text{-}1)$$

$$0.645 < \theta gF < 0.68 \quad (5\text{-}2)$$

$$0.605 < \theta hg < 0.645 \quad (6\text{-}2).$$

According to a preferred mode of the present invention, it is desirable that an interface between the positive lens and the negative lens in the first lens group be an aspheric surface.

According to a preferred mode of the present invention, it is desirable that the aspheric surface have a shape of which the curvature becomes increasingly smaller as compared to its paraxial curvature farther away from the optical axis.

According to a preferred mode of the present invention, it is desirable that the image forming optical system satisfy the following conditional expression (7):

$$1.70 < nd2 < 1.85 \quad (7)$$

where nd2 is a refractive index of the positive lens for the d-line.

According to a preferred mode of the present invention, it is desirable that the image forming optical system satisfy the following conditional expression (8):

$$55 < vd < 75 \quad (8)$$

where vd2 is the Abbe number (nd2−1)/(nF2−nC2) of the positive lens, where nd2, nF2, and nC2 are the refractive indices of the positive lens respectively for the d-line, F-line, and C-line.

According to a preferred mode of the present invention, it is desirable that the negative lens in the first lens group be made of a resin.

According to a preferred mode of the present invention, it is desirable that the resin be an energy curable resin.

According to a preferred mode of the present invention, it is desirable that the resin be the ultraviolet curable resin.

According to a preferred mode of the present invention, it is desirable that the second lens group comprise a cemented lens made up of one positive lens and one negative lens arranged in order from the object side.

According to a preferred mode of the present invention, it is desirable that the image side lens group include a third lens group, and the third lens group comprise, in order from the object side, one positive lens and a cemented lens made up of one positive lens and one negative lens.

According to a preferred mode of the present invention, it is desirable that the image side lens group include a rearmost lens group, and the rearmost lens group have a positive refracting power.

According to a preferred mode of the present invention, it is desirable that focusing is performed by moving the rearmost lens group along the optical axis direction.

According to a preferred mode of the present invention, it is desirable that the rearmost lens group be composed of one positive lens.

According to a preferred mode of the present invention, it is desirable that the rearmost lens group be made of a resin.

According to a second mode of the present invention, there can be provided an electronic image pickup apparatus characterized by comprising the above-described image forming optical system.

BRIEF DESCRIPTION OF THE DRAWINGS

FIG. 1A shows the zoom lens at the wide angle end, FIG. 1B shows the zoom lens in an intermediate focal length state, and FIG. 1C shows the zoom lens at the telephoto end;

FIG. 2A shows aberrations at the wide angle end, FIG. 2B shows aberrations in the intermediate focal length state, and FIG. 2C shows aberrations at the telephoto end;

FIG. 2A shows the zoom lens at the wide angle end, FIG. 2B shows the zoom lens in an intermediate focal length state, and FIG. 2C shows the zoom lens at the telephoto end;

FIG. 4A shows aberrations at the wide angle end, FIG. 4B shows aberrations in the intermediate focal length state, and FIG. 4C shows aberrations at the telephoto end;

FIGS. 5A, 5B, and 5C are cross sectional views along the optical axis showing the optical configuration of the zoom lens according to the third embodiment of the present invention in the state in which the zoom lens is focused at an object point at infinity, where FIG. 5A shows the zoom lens at the wide angle end, FIG. 5B shows the zoom lens in an intermediate focal length state, and FIG. 5C shows the zoom lens at the telephoto end;

FIG. 6A shows aberrations at the wide angle end, FIG. 6B shows aberrations in the intermediate focal length state, and FIG. 6C shows aberrations at the telephoto end;

FIG. 7A shows the zoom lens at the wide angle end, FIG. 7B shows the zoom lens in an intermediate focal length state, and FIG. 7C shows the zoom lens at the telephoto end;

FIG. 8A shows aberrations at the wide angle end, FIG. 8B shows aberrations in the intermediate focal length state, and FIG. 8C shows aberrations at the telephoto end;

FIG. 9A shows the zoom lens at the wide angle end, FIG. 9B shows the zoom lens in an intermediate focal length state, and FIG. 9C shows the zoom lens at the telephoto end;

FIG. 10A shows aberrations at the wide angle end, FIG. 10B shows aberrations in the intermediate focal length state, and FIG. 10C shows aberrations at the telephoto end;

FIG. 11A shows the zoom lens at the wide angle end, FIG. 11B shows the zoom lens in an intermediate focal length state, and FIG. 11C shows the zoom lens at the telephoto end;

FIG. 12A shows aberrations at the wide angle end, FIG. 12B shows aberrations in the intermediate focal length state, and FIG. 12C shows aberrations at the telephoto end;

FIG. 13A shows the zoom lens at the wide angle end, FIG. 13B shows the zoom lens in an intermediate focal length state, and FIG. 13C shows the zoom lens at the telephoto end;

FIG. 14A shows aberrations at the wide angle end, FIG. 14B shows aberrations in the intermediate focal length state, and FIG. 14C shows aberrations at the telephoto end;

FIG. 15A shows the zoom lens at the wide angle end, FIG. 15B shows the zoom lens in an intermediate focal length state, and FIG. 15C shows the zoom lens at the telephoto end;

FIG. 16A shows aberrations at the wide angle end, FIG. 16B shows aberrations in the intermediate focal length state, and FIG. 16C shows aberrations at the telephoto end;

FIG. 23A is a front view of the cellular phone 400, FIG. 23B is a side view of the cellular phone 400, and FIG. 23C is a cross sectional view of the image taking optical system 405.

DETAILED DESCRIPTION OF THE INVENTION

Figure 1A:
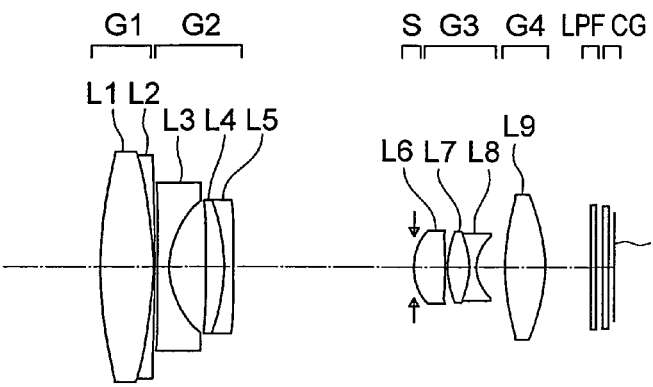
FIGS. 1A, 1B, and 1C are cross sectional views along the optical axis showing the optical configuration of the zoom lens according to the first embodiment of the present invention in the state in which the zoom lens is focused at an object point at infinity, where

Prior to the description of embodiments, the operation and advantageous effects of the image forming optical system according to a mode will be described. In the following description, the term "positive lens" will refer to a lens element having a positive paraxial focal length, and the term "negative lens" will refer to a lens element having a negative paraxial focal length.

The image forming optical system according to this mode includes a first lens group having a positive refracting power, a second lens group having a negative refracting power, and an image side lens group located on the image side of the negative second lens group and having a positive composite refracting power, and the first lens group is composed of a cemented lens made up of one positive lens and one negative lens arranged in order from the object side. The image forming optical system is characterized by satisfying the following conditional expressions (1-1) and (2-1):

$$0.05 < T1g/Flt < 0.10 \quad (1\text{-}1)$$

$$0.50 < \theta gF < 0.75 \quad (2\text{-}1)$$

where T1g is the thickness of the first lens group on the optical axis, Flt is the focal length of the entire image forming optical system at the telephoto end, and $\theta gF$ is the partial dispersion ratio $(ng1-nF1)/(nF1-nC1)$ of the negative lens, where nC1, nF1, ng1 are the refractive indices of the negative lens respectively for the C-line, F-line, and g-line.

When conditional expression (1-1) is satisfied, the thickness of the first lens group is smaller than the focal length at the telephoto end. Therefore, the thickness in the state in which the optical system is collapsed will be small. In addition, aberrations including chromatic aberrations can be corrected excellently, and variations in aberrations with zooming can be suppressed favorably.

If the upper limit of conditional expression (1-1) is exceeded, the thickness of the first lens group will be large, and collapsed thickness cannot be made small. If the lower limit of conditional expression (1-1) is exceeded, the thickness of the first lens group will become very small. However, the edge thickness of the positive lens will become small accordingly, making machining and handling of the lens difficult. If the edge thickness is made larger to prevent this, it is necessary to make the radius of curvature of the cemented surface between the positive lens and the negative lens larger, which leads to deterioration in chromatic aberration.

If conditional expression (2-1) is satisfied, secondary spectrum generated in the short wavelength range can be suppressed. Secondary spectrum in the short wavelength range, or residual chromatic aberrations with respect to the g-line in the case where achromatization is focused on the wavelength range between the C-line and the F-line affects the contrast of images. If conditional expression (2-1) is satisfied, images having high contrast can be obtained.

If the upper limit of conditional expression (2-1) is exceeded, large secondary spectrum will be generated, and images having high contrast cannot be obtained. If the lower limit of conditional expression (2-1) is exceeded, the difference between the value of θgF of the negative lens and that of the positive lens becomes large, and chromatic aberrations cannot be corrected satisfactorily in the short wavelength range. In addition, it becomes difficult to produce the lens material.

It is more preferred that the image forming optical system according to this mode satisfy the following conditional expressions (1-2) and (2-2):

$$0.07 < T1g/Flt < 0.09 \quad (1\text{-}2)$$

$$0.52 < \theta gF < 0.73 \quad (2\text{-}2).$$

If conditional expression (1-2) is satisfied, chromatic aberrations can be suppressed, and the thickness of the first lens group can be made small. If conditional expression (2-2) is satisfied, secondary spectrum and chromatic aberrations in the short wavelength range can further be suppressed. Therefore, images having high contrast can be obtained.

As above, if conditional expressions (1-1) and (2-1), and more preferably (1-2) and (2-2) are satisfied, the thickness of the first lens group, the collapsed thickness, and the entire length of the optical system can be made small without deterioration in chromatic aberrations etc. In consequence, a slim camera having high image quality can be provided.

It is also preferred that the image forming optical system according to this mode satisfy the following conditional expressions (3-1) and (4-1):

$$1.50 < nd1 < 1.70 \quad (3\text{-}1)$$

$$16 < vd1 < 28 \quad (4\text{-}1).$$

where nd1 is the refractive index of the negative lens for the d-line, and vd1 is the Abbe number (nd1−1)/(nF1−nC1) of the negative lens, where nC1, nF1, and ng1 are the refractive indices of the negative lens respectively for the C-line, F-line, and g-line.

Since the first lens group has a positive refracting power, the Petzval sum of the first lens group has a positive value. If the refractive index of the negative lens is low, the Petzval sum of the negative lens portion is negative and has a large absolute value. Consequently, the Petzval sum of the first lens group approaches to zero. Therefore, the Petzval sum of the entire optical system also approaches to zero, if the Petzval sum of each of the other single lens groups is made equal to zero, or the Petzval sum of the other lens groups as a whole is made equal to zero. In consequence, influences of curvature of field can be made small.

As the refractive index nd of the negative lens in the first lens group satisfies conditional expression (3-1), the refractive index is low. Therefore, the Petzval sum of the first lens group and the Petzval sum of the entire optical system can be made close to zero. Consequently, influences of curvature of field can be made small.

If the upper limit of conditional expression (3-1) is exceeded, the Petzval sum of the first lens group cannot be made small, and therefore influences of curvature of field become large. If the lower limit of conditional expression (3-1) is exceeded, the refracting power of the negative lens becomes low, and therefore it becomes difficult to correct spherical aberration at the telephoto end.

As the negative lens in the first lens group satisfies conditional expression (4-1), it has a large dispersion. Therefore, when it is used in the cemented lens in combination with the positive lens in the first lens group, good correction of chromatic aberration can be achieved.

If the upper limit of conditional expression (4-1) is exceeded, the difference in the Abbe number between the negative lens and the positive lens becomes so small that correction of chromatic aberrations will be difficult. If the lower limit of conditional expression (4-1) is exceeded, it becomes difficult to produce the lens material.

It is more preferred that that the image forming optical system according to this mode satisfy the following conditional expressions (3-2) and (4-2):

$$1.57 < nd1 < 1.67 \quad (3\text{-}2)$$

$$19 < vd1 < 26 \quad (4\text{-}2).$$

If conditional expression (3-2) is satisfied, the Petzval sum can be made further smaller, and therefore influences of curvature of field can be reduced. If conditional expression (4-2) is satisfied, better correction of chromatic aberrations can be achieved.

As described above, if the image forming optical system according to this mode satisfies conditional expressions (3-1) and (4-1), more preferably conditional expressions (3-2) and (4-2), curvature of field and chromatic aberration can be corrected more excellently, and therefore a slim camera having higher image quality can be provided.

It is also preferred that the image forming optical system according to this mode satisfies the following conditional expression (3-1), (5-1), and (6-1):

$$1.50 < nd1 < 1.70 \quad (3\text{-}1)$$

$$0.54 < \theta gF < 0.72 \quad (5\text{-}1)$$

$$0.51 < \theta hg < 0.68 \quad (6\text{-}1).$$

where nd1 is the refractive index of the negative lens for the d-line, θgF is the partial dispersion ratio (ng1−nF1)/(nF1−nC1) of the negative lens, θhg is the partial dispersion ratio (nh1−ng1)/(nF1−nC1) of the negative lens, where nF1, nC1, nh1, and ng1 are the refractive indices of the negative lens respectively for the F-line, C-line, h-line, and g-line.

Conditional expression (3-1) has been described above.

A description will be made of conditional expressions (5-1) and (6-1). Residual chromatic aberration with respect to the g-line in the case where achromatization is focused on the wavelength range between the C-line and the F-line, or secondary spectrum in the short wavelength range affects the contrast of images. Therefore, if the partial dispersion ratio θgF satisfies conditional expression (5-1), images having high contrast can be obtained. Although similar residual chromatic aberration with respect to the h-line does not largely affect the contrast of images, it causes color blur. Therefore, if the partial dispersion ratio θhg satisfies conditional expression (6-1), images with reduced color blur can be obtained.

If the upper limit of conditional expression (5-1) is exceeded, effects of secondary spectrum becomes large, and images having high contrast cannot be obtained. If the upper limit of conditional expression (6-1) is exceeded, large color blur will be generated. If the lower limits of conditional expressions (5-1) and (6-1) are exceeded, the difference in the value of θgF between the negative lens and the positive lens becomes large, and effects of chromatic aberrations increase in the short wavelength range. In addition, it becomes difficult to produce the material.

It is preferred that the image forming optical system according to this mode satisfy the following conditional expressions (3-1), (5-2), and (6-2).

$$1.50 < nd < 1.70 \quad (3\text{-}1)$$

$$0.645 < \theta gF < 0.68 \quad (5\text{-}2)$$

$$0.605 < \theta hg < 0.645 \quad (6\text{-}2).$$

If conditional expression (5-2) is satisfied, effects of secondary spectrum is further reduced, and images having higher contrast can be obtained. If conditional expression (6-2) is satisfied, color blur can further be reduced.

As described above, in the image forming optical system according to this mode, if the negative lens in the first lens group satisfies conditional expressions (3-1), (5-1), and (6-1), more preferably (3-1), (5-2), and (6-2), good correction of curvature of field, contrast, and color blur can be achieved, and therefore, it is possible to provide a slim camera with which images having higher image quality can be obtained.

In the image forming optical system according to this mode, it is preferred that the interface between the positive lens and the negative lens in the first lens group be an aspheric surface. This enables correction of chromatic aberrations utilizing the difference in Abbe number vd.

In the first lens group, beams traveling toward high image height positions incident on the lens at high ray height positions (i.e. positions on the lens surface distant from the optical axis). In consequence, higher order chromatic aberrations tend to occur with regard particularly to beams traveling toward high image height positions. In view of this, an aspheric surface design may be used in the interface between the positive lens and the negative lens. This increases the degree of freedom in the shape of the high ray height region of the lens surface, which enables good correction of higher order chromatic aberrations with respect to the image height, in particular chromatic aberration of magnification. As above, if the interface between the positive lens and the negative lens in the first lens group is aspheric, higher order chromatic aberration of magnification can be corrected excellently even at high image heights, and therefore images having high image quantity can be obtained.

It is also preferred in the image forming optical system according to this mode that the aspheric surface have a shape of which the curvature becomes increasingly smaller as compared to the paraxial curvature farther away from the optical axis. If the interface between the positive lens and the negative lens in the first lens group has such a shape, beams traveling toward high image height positions are incident on the interface at small incidence angles, and consequently higher order chromatic aberrations of magnification with respect to the image height can be made small. Since higher order chromatic aberrations of magnification with respect to the image height can be corrected excellently, images having high image quality can be obtained.

It is also preferred that the image forming optical system according to this embodiment satisfy the following conditional expression (7):

$$1.70 < nd2 < 1.85 \quad (7)$$

where nd2 is the refractive index of the positive lens in the first lens group for the d-line.

If conditional expression (7) is satisfied, the positive lens in the first lens group has a high refractive index, and has a higher refracting power accordingly as compared to lenses having lower refractive indices. Therefore, it can bend rays greatly. This allows to make the radius of curvature of the positive lens larger, and therefore the lens can readily have an adequate edge thickness. Consequently, the thickness of the lens can be made smaller.

Since the sliming of the positive lens in the first lens group enables a reduction in the entire length of the optical system not to mention a reduction in the entire thickness of the first lens group, the collapsed thickness can be made small. Furthermore, since rays can be bent largely, the outer diameter of the first lens group can be made small.

In addition, if the radius of curvature of the positive lens can be made larger, spherical aberration generated at telephoto range can be decreased.

As above, since the entire thickness and the collapsed thickness of the image forming optical system according to this mode can be made small and the outer diameter of the first lens group can be made small, there can be provided a slim and small optical system.

It is also preferred that the image forming optical system according to this mode satisfy the following conditional expression (8):

$$55 < vd2 < 75 \quad (8)$$

where vd2 is the Abbe number (nd2−1)/(nF2−nC2) of the positive lens in the first lens group, where nd2 nF2, nC2 are the refractive indices of the positive lens respectively for the d-line, F-line, and C-line.

When conditional expression (8) is satisfied, the positive lens in the first lens group has a large Abbe number and the dispersion thereof is low. To decrease the thickness of the first lens group while keeping the edge thickness of the positive lens adequately large, it is necessary to make the curvature of the interface between the positive lens and the negative lens small. This tends to make correction of chromatic aberrations difficult, and large chromatic aberrations will be generated in the first lens group.

If the dispersion of the positive lens in the first lens group is low, the difference in the Abbe number between the positive lens and the negative lens can be made large. This enables good correction of chromatic aberrations even if the curvature of the interface therebetween is small. Consequently, high quality images with small chromatic aberrations can be obtained even when the thickness of the first lens group is made small.

In the image forming optical system according to this mode, it is preferred that the negative lens be made of a resin. Resin materials are light in weight and inexpensive as compared to glass materials. In the optical system in which the first lens group moves during zooming, the movement amount of the first lens group is generally large. For this reason, if the first lens group is light in weight, the drive system such as a motor that drives the first lens group can be made small, and therefore the overall size of the camera can be made small. In addition, the power consumption can be reduced.

Furthermore, when the negative lens in the first lens group is made of a resin, the negative lens can be formed on the positive lens by direct molding. (This type of lens is called a hybrid lens). In the direct molding, the negative lens portion is produced by applying or discharging liquid resin onto the positive lens and curing it. Therefore, the thickness of the inner portion of the negative lens can be made very small as compared to that of the negative lens produced individually. Consequently, the thickness of the first lens group can be made as small as the thickness of the positive lens alone. Thus, the entire length of the optical system and the collapsed thickness can be made particularly small.

It is preferred that the resin of which the negative lens is made be an energy curable resin. As described above, the negative lens is produced by applying or discharging a resin onto the positive lens, thereafter extending it using a mold, and curing it with energy supply. In the case of this method, if the resin is an energy curable resin, the hybrid lens can easily be produced. Examples of the energy curable resin include heat curable resins and ultraviolet curable resins.

It is more preferred that the energy curable resin be an ultraviolet curable resin. Since the ultraviolet curable resin can be cured without application of heat, a material with low heat resistance such as a plastic may be used for the positive lens that serves as the substrate. In addition, the molding apparatus can be made small.

It is also preferred that the second lens group of the image forming optical system according to this mode include a cemented lens made up of one positive lens and one negative lens arranged in order from the object side. If the second lens group includes such a cemented lens, off-axis aberrations such as distortion and coma can be corrected more excellently. In consequence, high quality images with small distortion even in their peripheral regions can be obtained even when the optical system is designed to have a wide angle of view.

It is also preferred that the image side lens group of the image forming optical system according to this mode include a third lens group, which includes, in order from the object side, one positive lens and a cemented lens made up of one positive lens and one negative lens. If the third lens group has this configuration, the entire length of the optical system can easily be made small. Thus, a small optical system can be provided.

It is also preferred that the image side lens group of the image forming optical system according to this mode includes a rearmost lens group, and the rearmost lens group have a positive refracting power. If the rearmost lens group has a positive refracting power, rays at high image heights are refracted at positions near the image plane, and they can be incident on the image plane at nearly right angle. In consequence, effects of shading on the sensor can be reduced, and images that is bright even in their peripheral regions can be obtained.

In the image forming optical system according to this mode, it is preferred that focusing is performed by moving the rearmost lens group along the optical axis direction. If focusing is performed by moving the first lens group, the movement amount of the lens group for focusing will be large. Then, in order to attain focusing without exclusion of rays, it is necessary that the first lens group have a large outer diameter. Therefore, it is practically difficult to perform focusing by moving the first lens group, if the size reduction is to be achieved.

On the other hand, since the second lens group and the third lens group are variator lens groups, moving these groups along the optical axis for focusing results in changes in the magnification of the image. Furthermore, when the magnification of the focusing lens group is close to unit magnification, focusing cannot be performed. In the case of the image forming optical system (zoom lens) according to this mode, in particular if it has a high zoom ratio, there is a focal length at which the second lens group or the third lens group has unit magnification. Therefore, the second lens group or the third lens group is not suitable for use as the focusing group.

In contrast, the rearmost lens group does not have unit magnification throughout the entire zoom range. Therefore, in the image forming optical system according to this mode, focusing can be performed by moving the rearmost lens group along the optical axis direction. By using the rearmost lens group as the focusing lens group, it is possible to perform focusing without affecting the magnification of the image significantly.

In the image forming optical system according to this mode, it is preferred that the rearmost lens group that moves during focusing be composed of one positive lens. The focusing lens group is frequently moved. If the focusing lens group includes multiple lenses, the lens group tends to be heavy, which necessitates a large drive system for focusing. In addition, power consumption in moving the lens group increases. If the rearmost lens group (or focusing lens group) is composed of one positive lens, the lens system can be made lighter, and in addition the drive system can be made smaller as compared to the case where the focusing lens group includes multiple lenses. Therefore, the power consumption can be reduced.

Furthermore, since the thickness of the rearmost lens group itself can be made small, the collapsed thickness can be made small. As above, if the rearmost lens group is composed of one positive lens, the collapsed thickness of the optical system can be made small and the size of the drive system can be made small. Therefore, a small-size camera can be provided.

In the image forming optical system according to this mode, it is preferred that the rearmost lens group that is moved during focusing be made of a resin. Since the resin is lighter than the glass, if the rearmost lens group is made of a resin, the rearmost lens group can be made further lighter. Thus, a further reduction in the size of the drive system for focusing and a decrease in the power consumption can be achieved, and it is possible to provide a smaller size camera.

It is preferred that an electronic image pickup apparatus according to this mode includes the above-described image forming optical system. With the above-described image forming optical system, it is possible to make the entire length of the optical system and the collapsed thickness small without deterioration of chromatic aberrations. Therefore, if this image forming optical system is used in an electronic image pickup apparatus, there can be provided a slim electronic image pickup apparatus with which high quality images can be obtained.

In the following, zoom lenses as embodiments of the image forming optical system will be described.

Figure 1B:
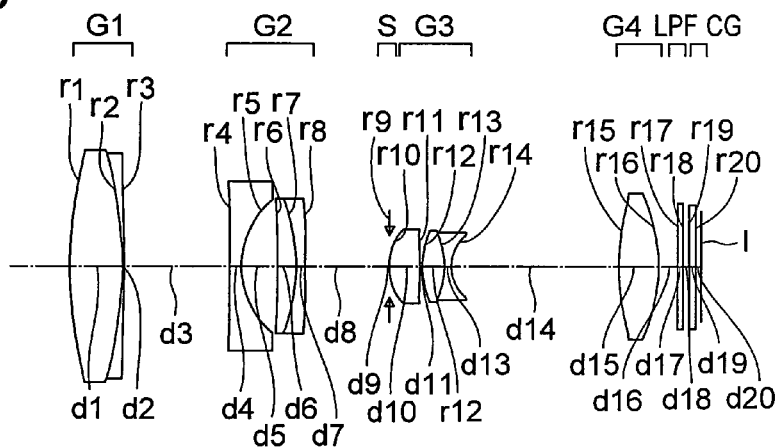
Figure 1C:
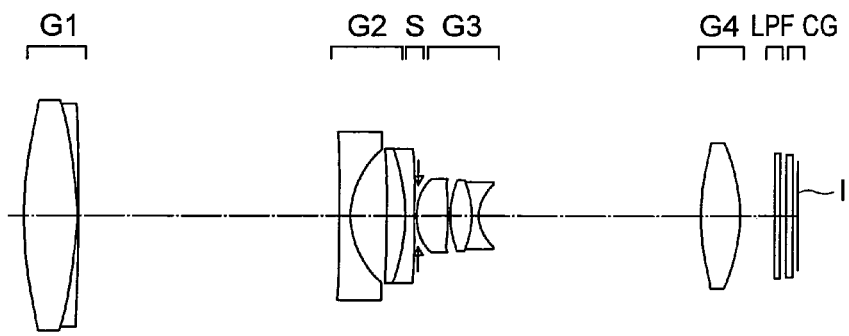

First, a zoom lens according to a first embodiment will be described. FIGS. 1A, 1B, and 1C are cross sectional views along the optical axis showing the optical configuration of the zoom lens according to the first embodiment in the state in which the zoom lens is focused at an object point at infinity, where FIG. 1A is a cross sectional view of the zoom lens at the wide angle end, FIG. 1B is a cross sectional view of the zoom lens in an intermediate focal length state, and FIG. 1C is a cross sectional view of the zoom lens at the telephoto end.

Figure 2A:
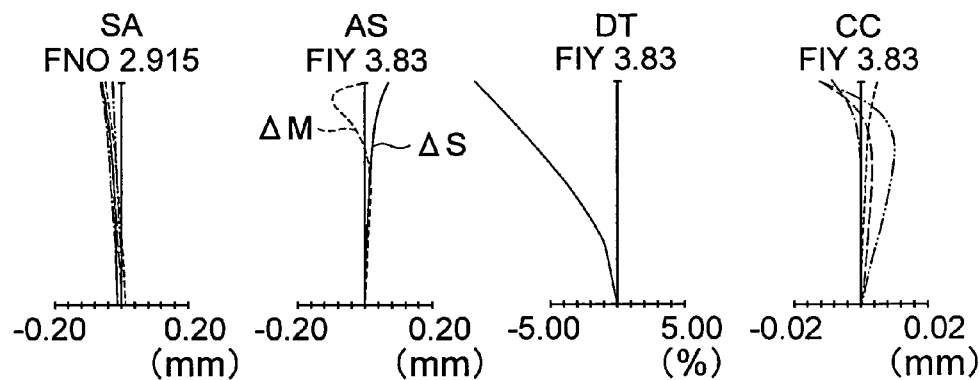
FIGS. 2A, 2B, and 2C are diagrams showing spherical aberration, astigmatism, distortion, and chromatic aberration of magnification (CC) of the zoom lens according to the first embodiment in the state in which the zoom lens is focused on an object point at infinity, where
Figure 2B:
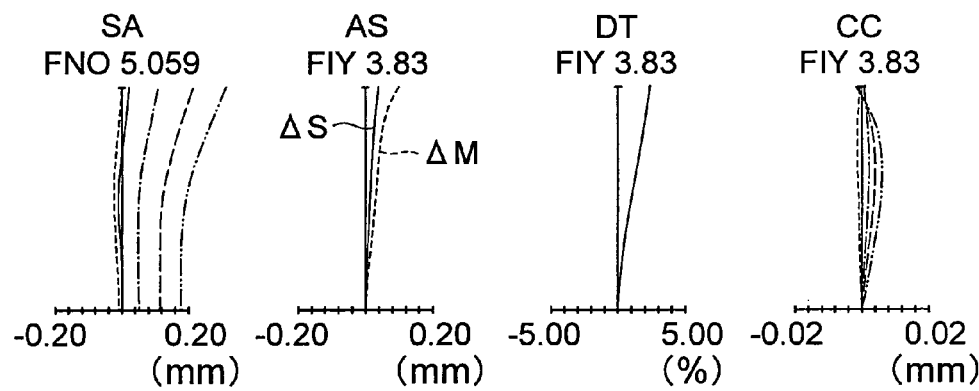
Figure 2C:
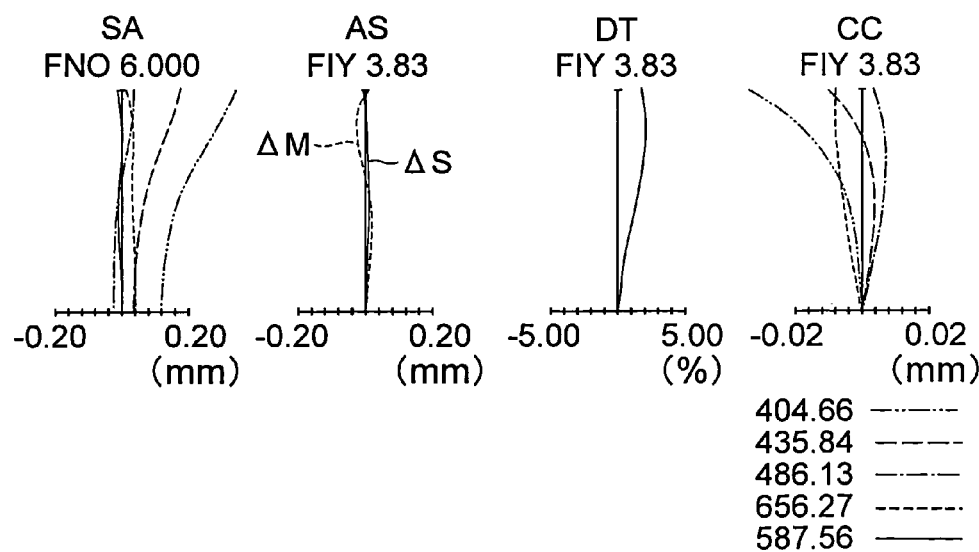

FIGS. 2A, 2B, and 2C are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIG. 2A shows aberrations at the wide angle end, FIG. 2B shows aberrations in the intermediate focal length state, and FIG. 2C shows aberrations at the telephoto end. In FIGS. 2A, 2B, and 2C, "FIY" stands for the image height. Common signs are used in the aberration diagrams of this embodiment and the later described embodiments.

As shown in FIGS. 1A to 1C, the zoom lens according to the first embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power. In all the cross sectional views of the zoom lenses according to the embodiment described in the following, a low pass filter is denoted by LPF, a cover glass is denoted by CG, and the image plane of the image pickup element is denoted by I.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side to an intermediate position and then toward the image side from the intermediate position, the aperture stop S moves toward the object side, the third lens group G3 moves toward the object side, and the fourth lens group G4 moves toward the image side to an intermediate position and then toward the object side from the intermediate position.

The following eight surfaces are aspheric surfaces: the image side surface of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

Figure 3A:
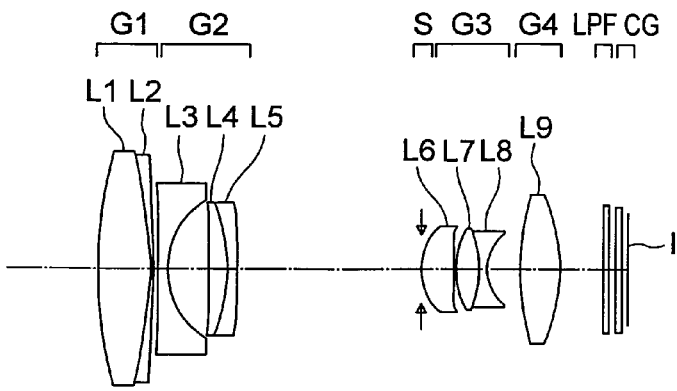
FIGS. 3A, 3B, and 3C are cross sectional views along the optical axis showing the optical configuration of the zoom lens according to the second embodiment of the present invention in the state in which the zoom lens is focused at an object point at infinity, where
Figure 3B:
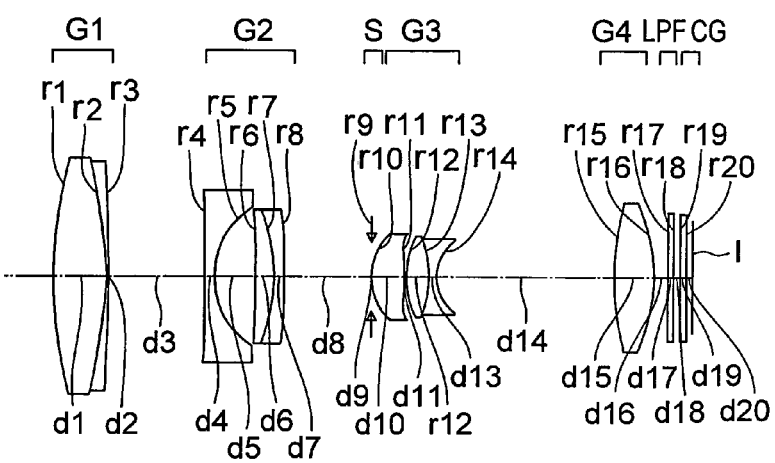
Figure 3C:
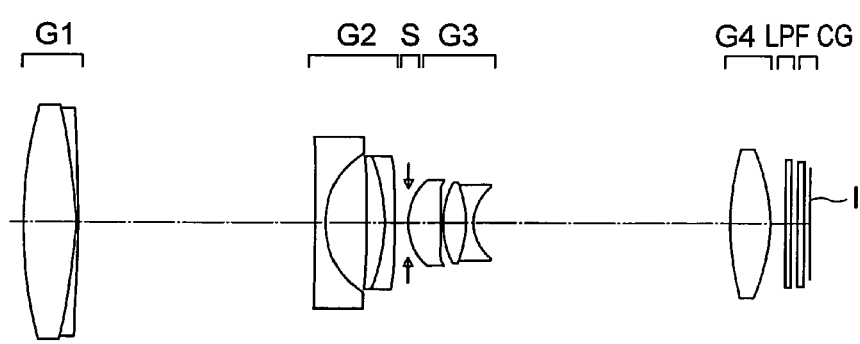

A zoom lens according to a first embodiment will be described. FIGS. 3A, 3B, and 3C are cross sectional views along the optical axis showing the optical configuration of the zoom lens according to the second embodiment in the state in which the zoom lens is focused at an object point at infinity, where FIG. 3A is a cross sectional view of the zoom lens at the wide angle end, FIG. 3B is a cross sectional view of the zoom lens in an intermediate focal length state, and FIG. 3C is a cross sectional view of the zoom lens at the telephoto end.

Figure 4A:
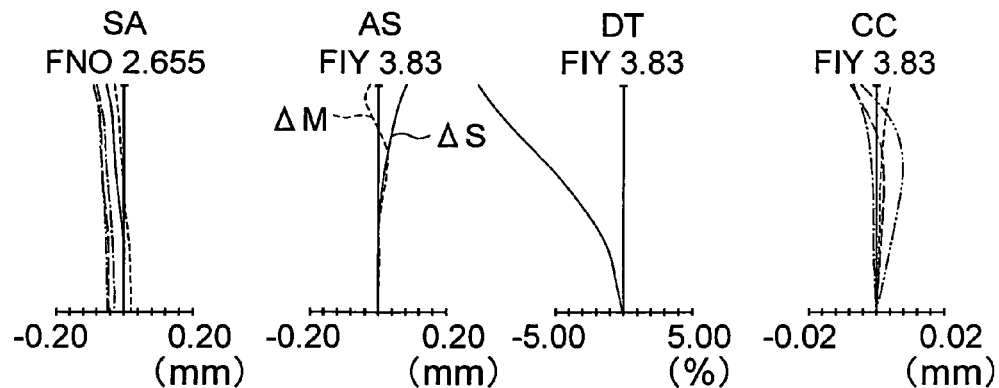
FIGS. 4A, 4B, and 4C are diagrams showing spherical aberration, astigmatism, distortion, and chromatic aberration of magnification (CC) of the zoom lens according to the second embodiment in the state in which the zoom lens is focused on an object point at infinity, where
Figure 4B:
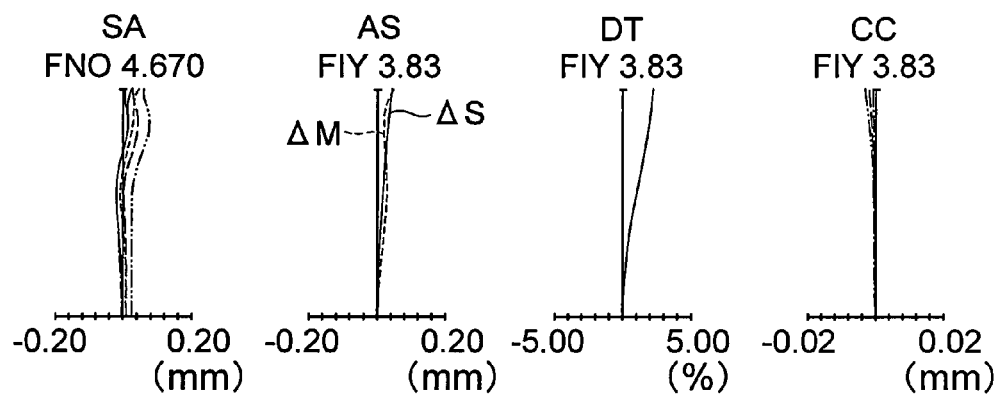
Figure 4C:
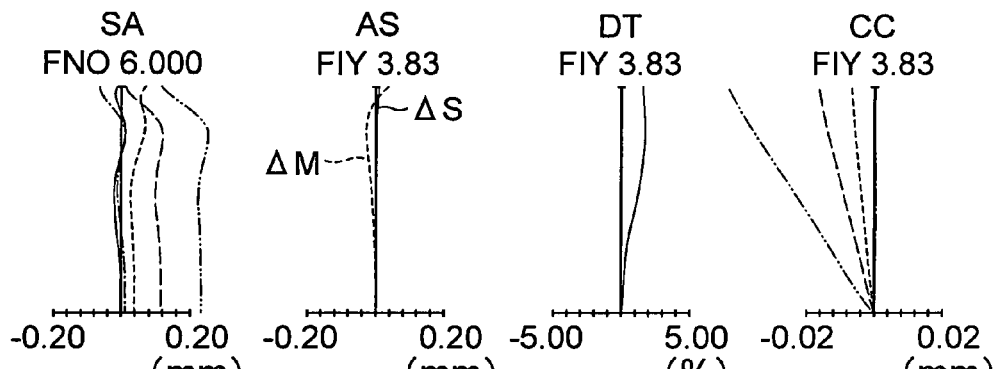

FIGS. 4A, 4B, and 4C are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIG. 4A shows aberrations at the wide angle end, FIG. 4B shows aberrations in the intermediate focal length state, and FIG. 4C shows aberrations at the telephoto end.

As shown in FIGS. 3A to 3C, the zoom lens according to the second embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side, the aperture stop S moves toward the object side, the third lens group G3 moves toward the object side, and the fourth lens group G4 moves toward the image side to an intermediate position and then toward the object side from the intermediate position.

The following nine surfaces are aspheric surfaces: both surfaces of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

A zoom lens according to a third embodiment will be described. FIGS. 5A, 5B, and 5C are cross sectional views along the optical axis showing the optical configuration of the zoom lens according to the third embodiment in the state in which the zoom lens is focused at an object point at infinity, where FIG. 5A is a cross sectional view of the zoom lens at the wide angle end, FIG. 5B is a cross sectional view of the zoom lens in an intermediate focal length state, and FIG. 5C is a cross sectional view of the zoom lens at the telephoto end.

Figure 6A:
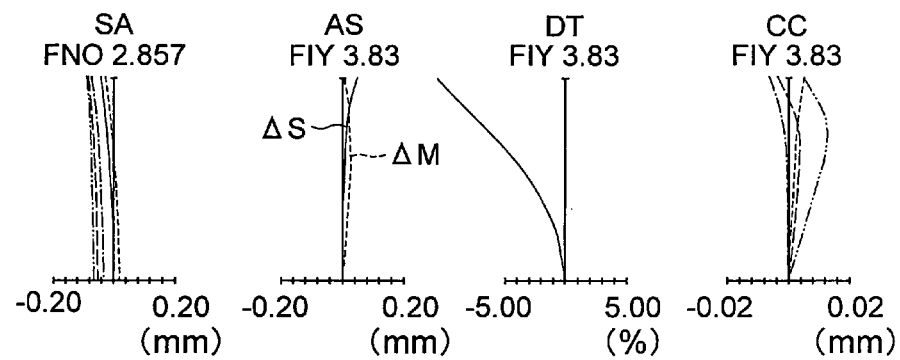
FIGS. 6A, 6B, and 6C are diagrams showing spherical aberration, astigmatism, distortion, and chromatic aberration of magnification (CC) of the zoom lens according to the third embodiment in the state in which the zoom lens is focused on an object point at infinity, where
Figure 6B:
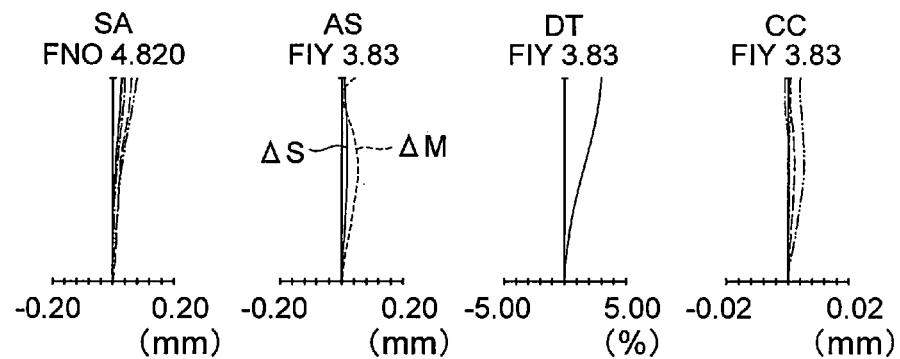
Figure 6C:
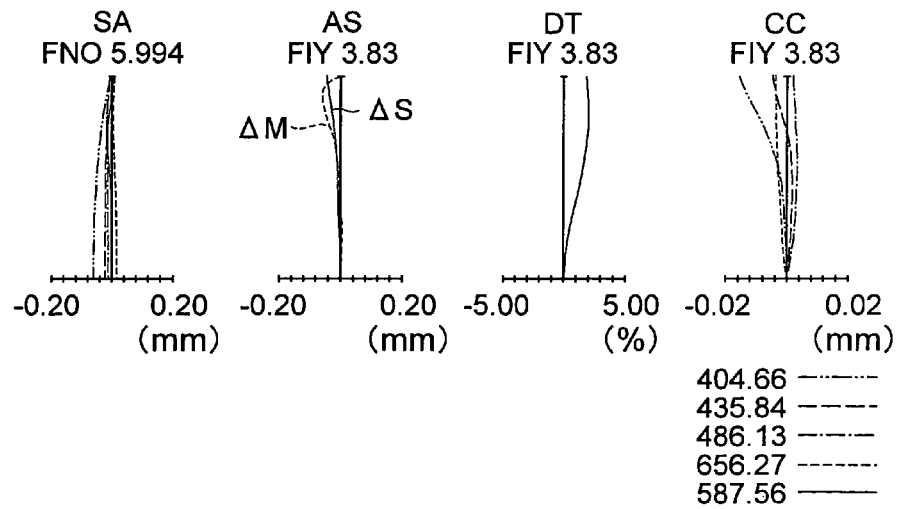

FIGS. 6A, 6B, and 6C are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIG. 6A shows aberrations at the wide angle end, FIG. 6B shows aberrations in the intermediate focal length state, and FIG. 6C shows aberrations at the telephoto end.

As shown in FIGS. 6A to 6C, the zoom lens according to the third embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side to an intermediate position and then toward the image side from the intermediate position, the aperture stop S moves toward the object side, the third lens group G3 moves toward the object side, and the fourth lens group G4 moves toward the image side.

The following nine surfaces are aspheric surfaces: both surfaces of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

Figure 7A:
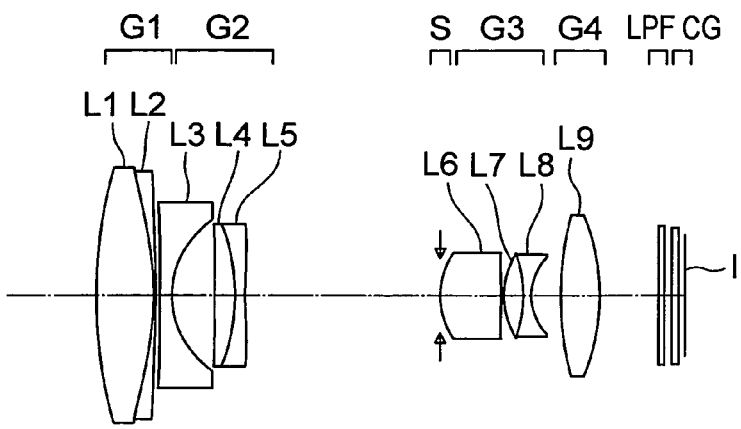
FIGS. 7A, 7B, and 7C are cross sectional views along the optical axis showing the optical configuration of the zoom lens according to the fourth embodiment of the present invention in the state in which the zoom lens is focused at an object point at infinity, where
Figure 7B:
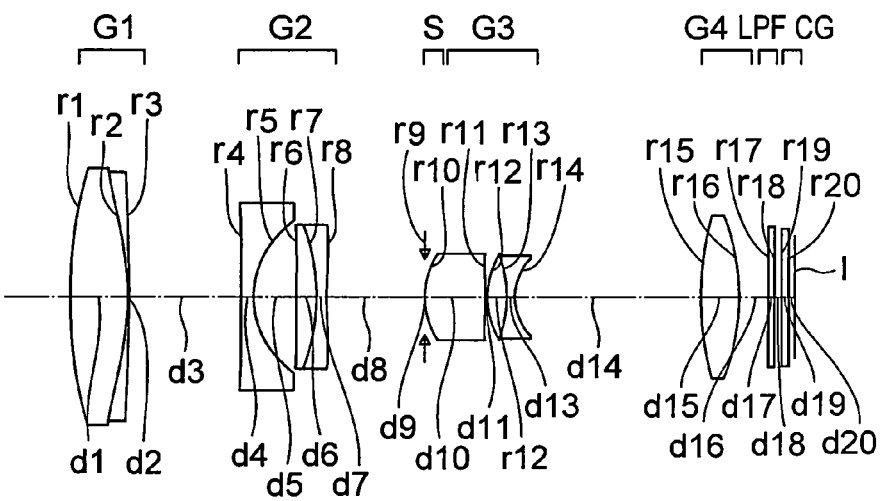
Figure 7C:
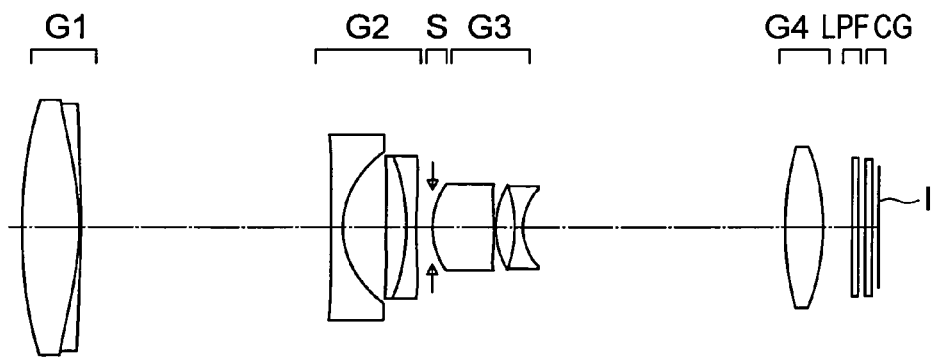

A zoom lens according to a fourth embodiment will be described. FIGS. 7A, 7B, and 7C are cross sectional views along the optical axis showing the optical configuration of the zoom lens according to the fourth embodiment in the state in which the zoom lens is focused at an object point at infinity, where FIG. 7A is a cross sectional view of the zoom lens at the wide angle end, FIG. 7B is a cross sectional view of the zoom lens in an intermediate focal length state, and FIG. 7C is a cross sectional view of the zoom lens at the telephoto end.

Figure 8A:
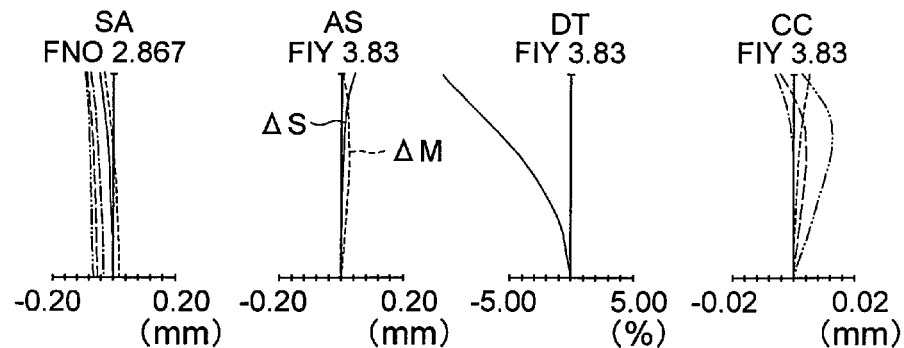
FIGS. 8A, 8B, and 8C are diagrams showing spherical aberration, astigmatism, distortion, and chromatic aberration of magnification (CC) of the zoom lens according to the fourth embodiment in the state in which the zoom lens is focused on an object point at infinity, where
Figure 8B:
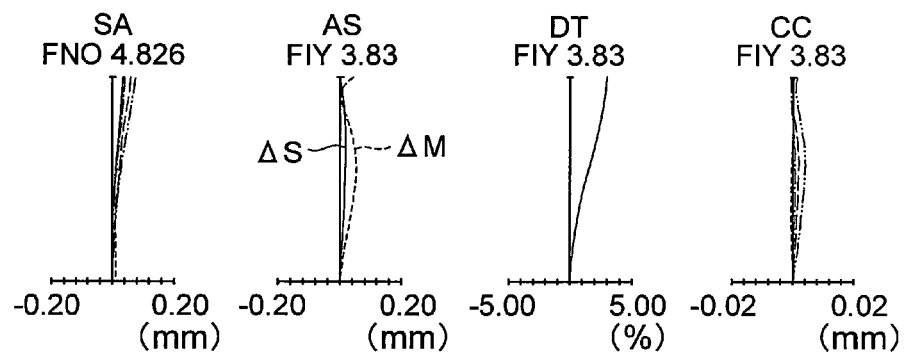
Figure 8C:
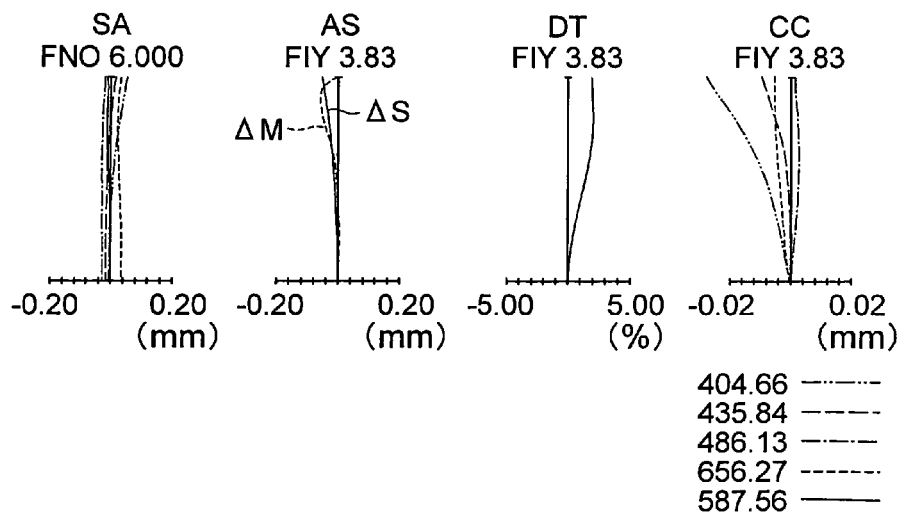

FIGS. 8A, 8B, and 8C are diagrams showing spherical aberration (SA), astigmatism (AS), distortion (DT), and chromatic aberration of magnification (CC) of the zoom lens according to the fourth embodiment in the state in which the zoom lens is focused on an object point at infinity, where FIG. 8A shows aberrations at the wide angle end, FIG. 8B shows aberrations in the intermediate focal length state, and FIG. 8C shows aberrations at the telephoto end.

As shown in FIGS. 7A to 7C, the zoom lens according to the fourth embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side to an intermediate position and then toward the image side from the intermediate position, the aperture stop S moves toward the object side, the third lens group G3 moves toward the object side, and the fourth lens group G4 moves toward the image side.

The following nine surfaces are aspheric surfaces: both surfaces of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

Figure 9A:
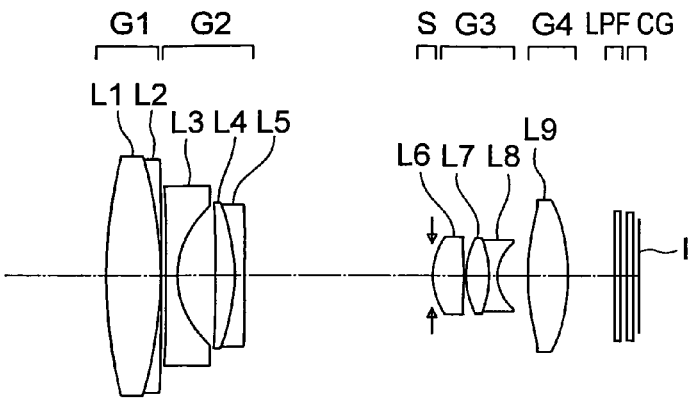
FIGS. 9A, 9B, and 9C are cross sectional views along the optical axis showing the optical configuration of the zoom lens according to the fifth embodiment of the present invention in the state in which the zoom lens is focused at an object point at infinity, where
Figure 9B:
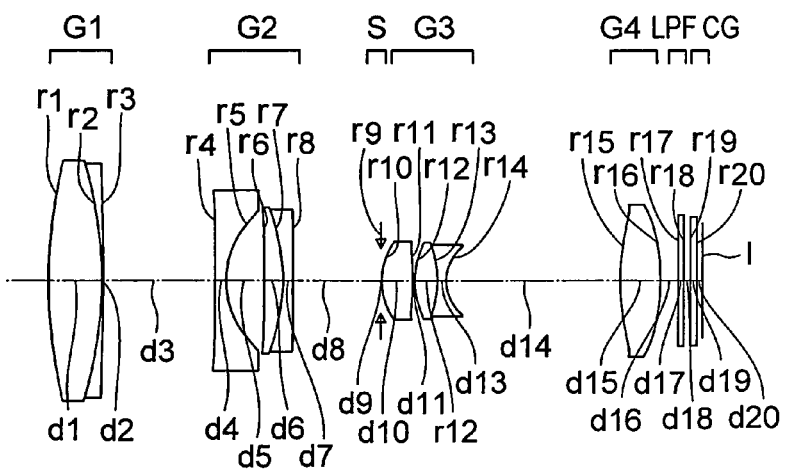
Figure 9C:
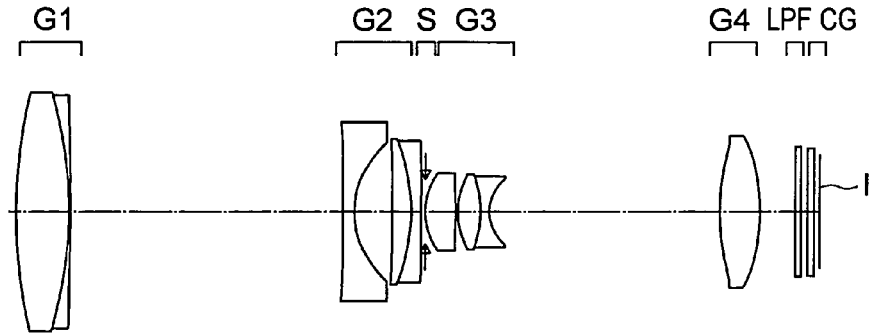

A zoom lens according to a fifth embodiment will be described. FIGS. 9A, 9B, and 9C are cross sectional views along the optical axis showing the optical configuration of the zoom lens according to the fifth embodiment in the state in which the zoom lens is focused at an object point at infinity, where FIG. 9A is a cross sectional view of the zoom lens at the wide angle end, FIG. 9B is a cross sectional view of the zoom lens in an intermediate focal length state, and FIG. 9C is a cross sectional view of the zoom lens at the telephoto end.

Figure 10A:
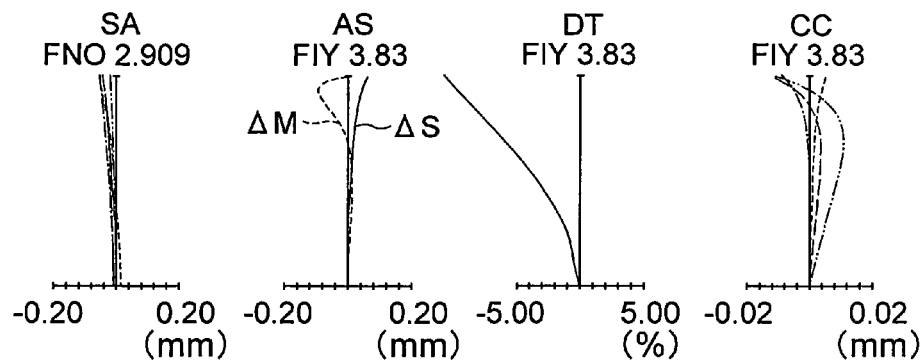
FIGS. 10A, 10B, and 10C are diagrams showing spherical aberration, astigmatism, distortion, and chromatic aberration of magnification (CC) of the zoom lens according to the fifth embodiment in the state in which the zoom lens is focused on an object point at infinity, where
Figure 10B:
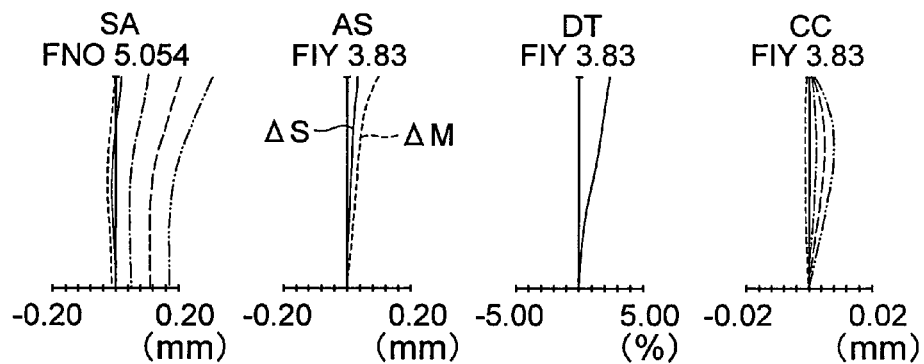
Figure 10C:
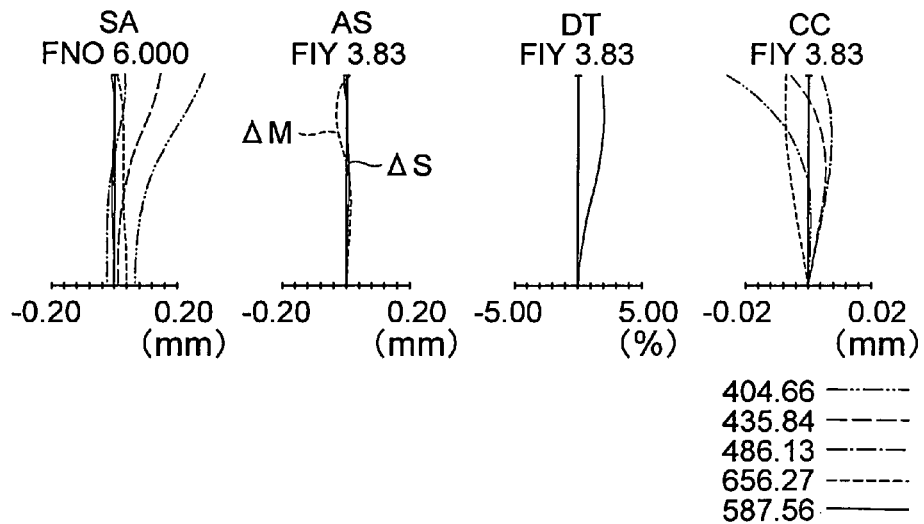

FIGS. 10A, 10B, and 10C are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIG. 10A shows aberrations at the wide angle end, FIG. 10B shows aberrations in the intermediate focal length state, and FIG. 10C shows aberrations at the telephoto end.

As shown in FIGS. 9A to 9C, the zoom lens according to the fifth embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side to an intermediate position and then toward the image side from the intermediate position, the aperture stop S moves toward the object side, the third lens group G3 moves toward the object side, and the fourth lens group G4 moves toward the image side to an intermediate position and then toward the object side from the intermediate position.

The following eight surfaces are aspheric surfaces: the image side surface of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

Figure 11A:
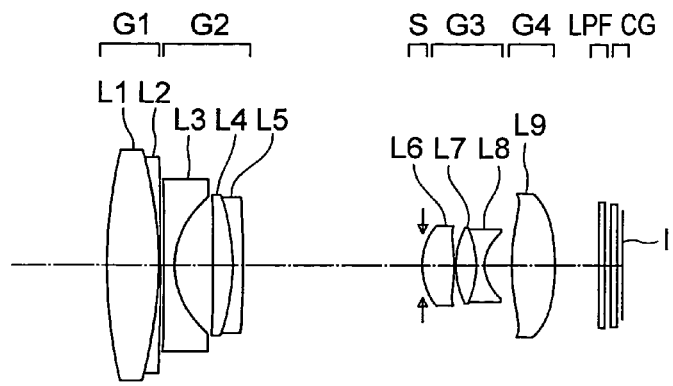
FIGS. 11A, 11B, and 11C are cross sectional views along the optical axis showing the optical configuration of the zoom lens according to the sixth embodiment of the present invention in the state in which the zoom lens is focused at an object point at infinity, where
Figure 11B:
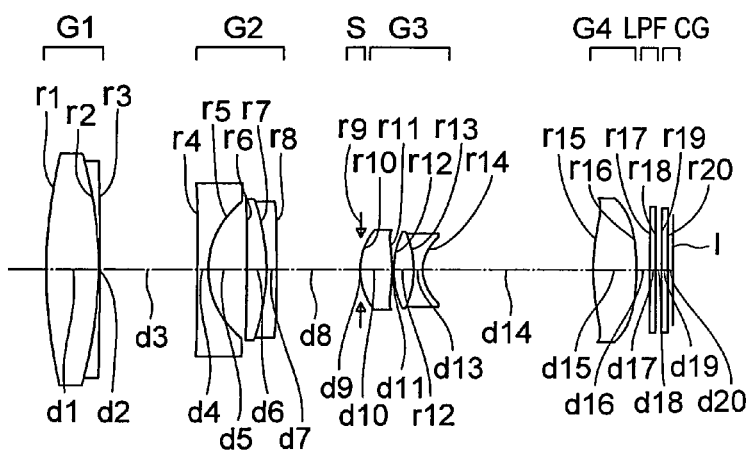
Figure 11C:
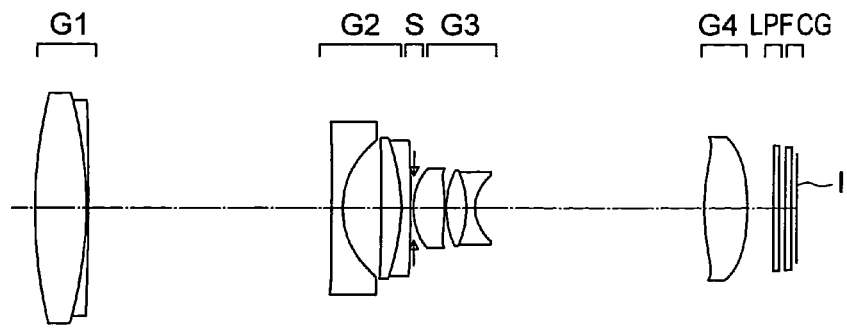

A zoom lens according to a sixth embodiment will be described. FIGS. 11A, 11B, and 11C are cross sectional views along the optical axis showing the optical configuration of the zoom lens according to the sixth embodiment in the state in which the zoom lens is focused at an object point at infinity, where FIG. 11A is a cross sectional view of the zoom lens at the wide angle end, FIG. 11B is a cross sectional view of the zoom lens in an intermediate focal length state, and FIG. 11C is a cross sectional view of the zoom lens at the telephoto end.

Figure 12A:
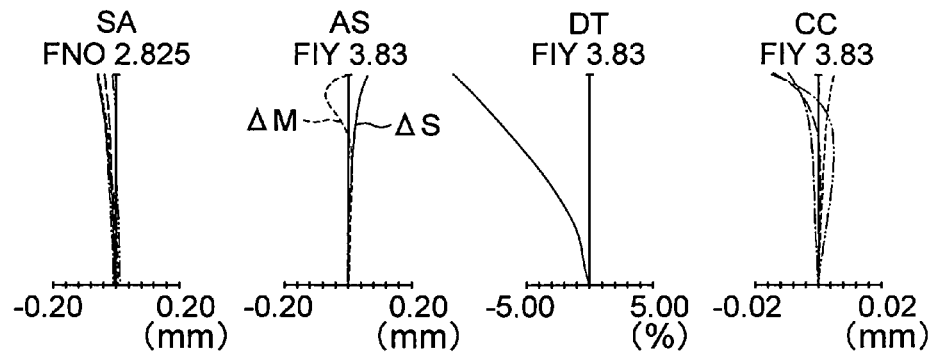
FIGS. 12A, 12B, and 12C are diagrams showing spherical aberration, astigmatism, distortion, and chromatic aberration of magnification (CC) of the zoom lens according to the sixth embodiment in the state in which the zoom lens is focused on an object point at infinity, where
Figure 12B:
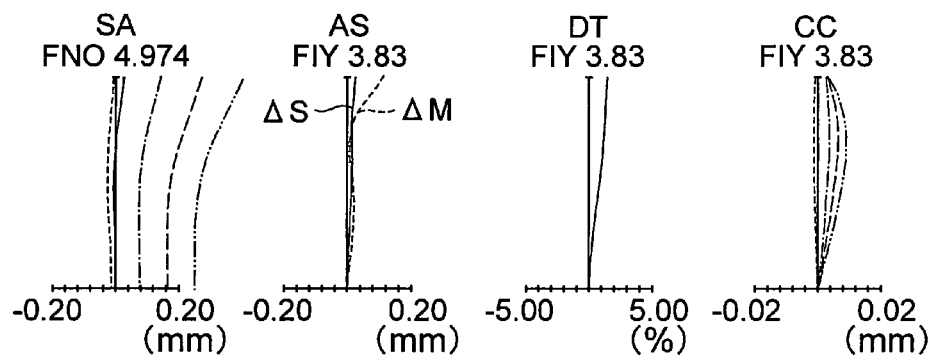
Figure 12C:
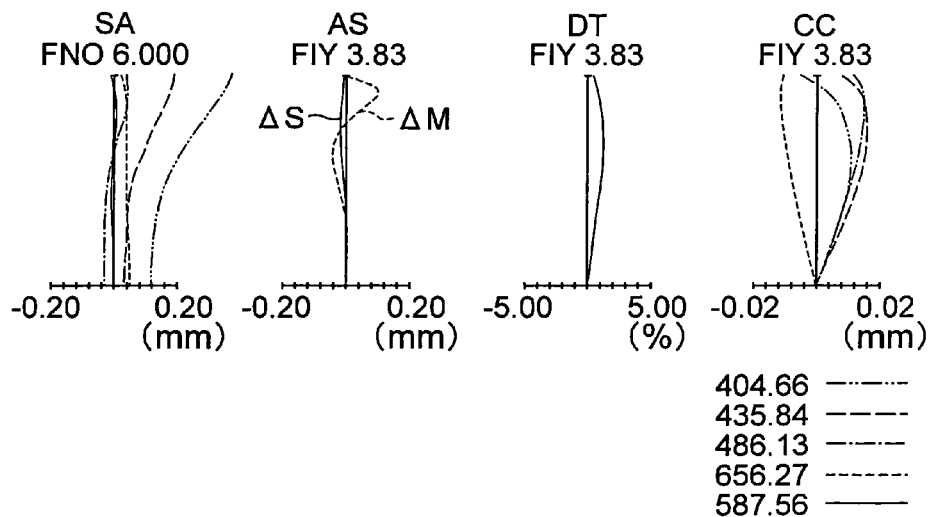

FIGS. 12A, 12B, and 12C are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIG. 12A shows aberrations at the wide angle end, FIG. 12B shows aberrations in the intermediate focal length state, and FIG. 12C shows aberrations at the telephoto end.

As shown in FIGS. 11A to 11C, the zoom lens according to the sixth embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side to an intermediate position and then toward the image side from the intermediate position, the aperture stop S moves toward the object side, the third lens group G3 moves toward the object side, and the fourth lens group G4 moves toward the image side to an intermediate position and then toward the object side from the intermediate position.

The following eight surfaces are aspheric surfaces: the image side surface of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

Figure 13A:
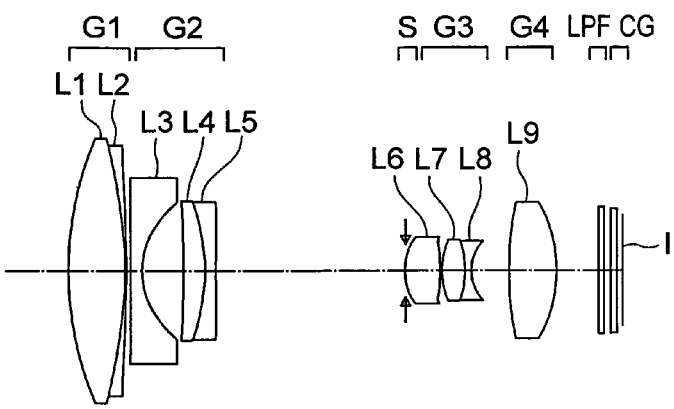
FIGS. 13A, 13B, and 13C are cross sectional views along the optical axis showing the optical configuration of the zoom lens according to the seventh embodiment of the present invention in the state in which the zoom lens is focused at an object point at infinity, where
Figure 13B:
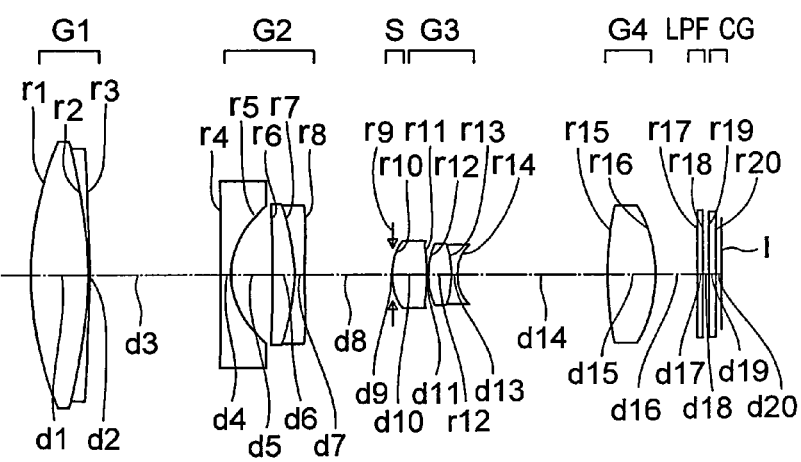
Figure 13C:
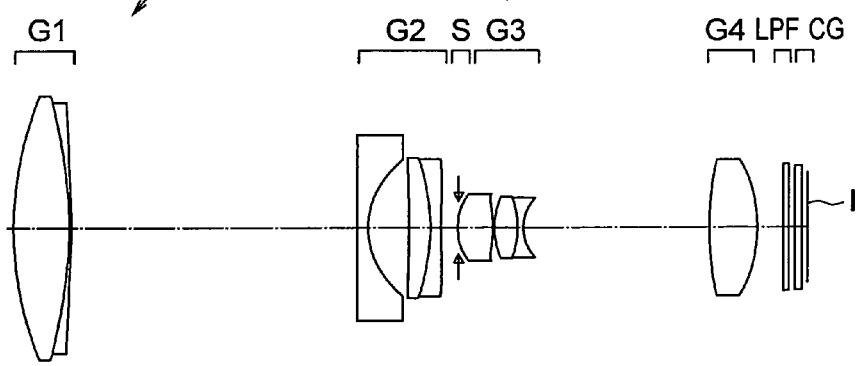

A zoom lens according to a seventh embodiment will be described. FIGS. 13A, 13B, and 13C are cross sectional views along the optical axis showing the optical configuration of the zoom lens according to the seventh embodiment in the state in which the zoom lens is focused at an object point at infinity, where FIG. 13A is a cross sectional view of the zoom lens at the wide angle end, FIG. 13B is a cross sectional view of the zoom lens in an intermediate focal length state, and FIG. 13C is a cross sectional view of the zoom lens at the telephoto end.

Figure 14A:
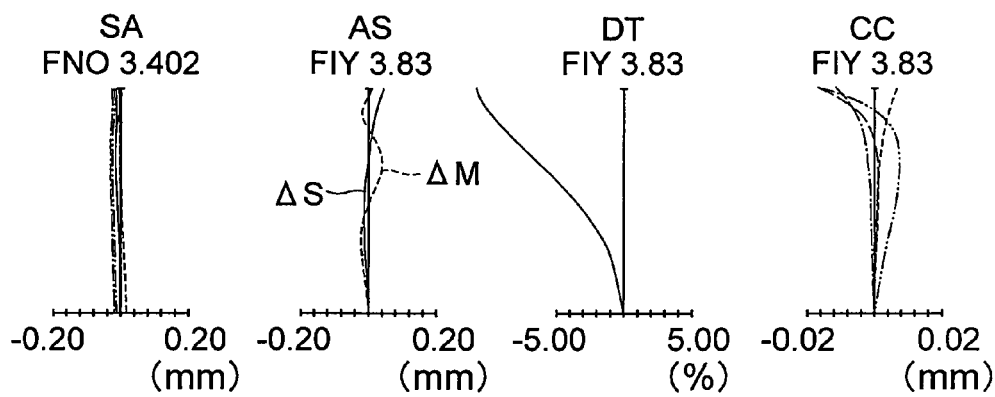
FIGS. 14A, 14B, and 14C are diagrams showing spherical aberration, astigmatism, distortion, and chromatic aberration of magnification (CC) of the zoom lens according to the seventh embodiment in the state in which the zoom lens is focused on an object point at infinity, where
Figure 14B:
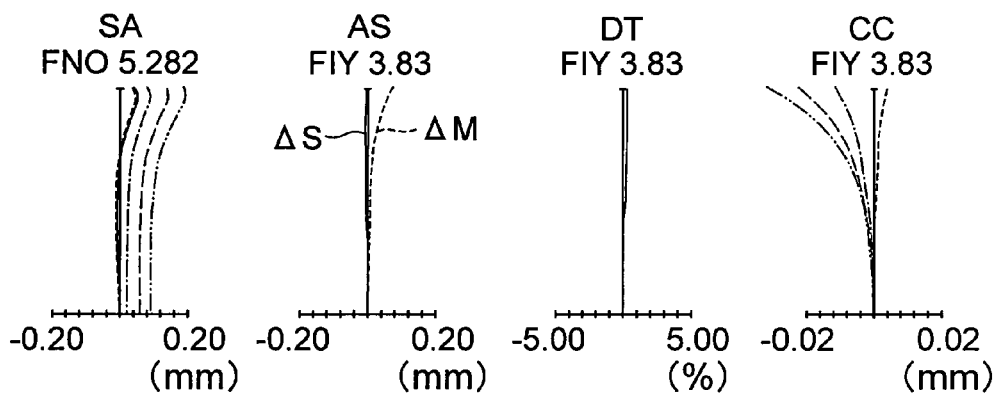
Figure 14C:
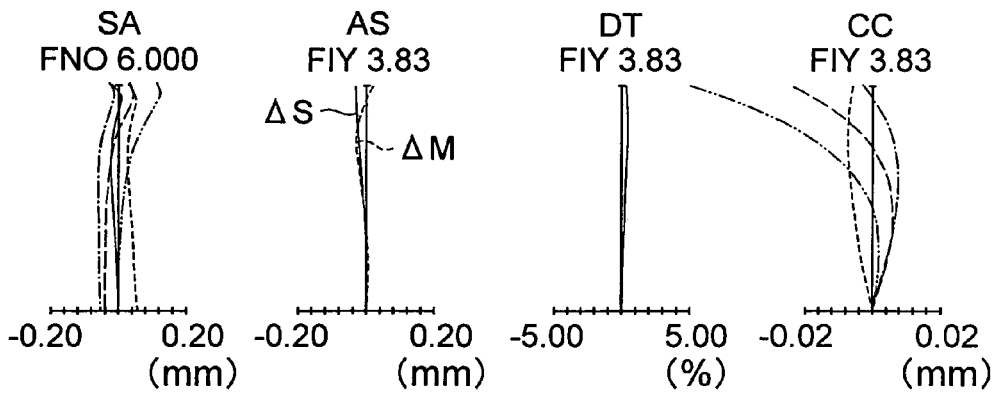

FIGS. 14A, 14B, and 14C are diagrams showing spherical aberration (SA), astigmatism (AS), distortion (DT), and chromatic aberration of magnification (CC) of the zoom lens according to the seventh embodiment in the state in which the zoom lens is focused on an object point at infinity, where FIG. 14A shows aberrations at the wide angle end, FIG. 14B shows aberrations in the intermediate focal length state, and FIG. 14C shows aberrations at the telephoto end.

As shown in FIGS. 13A to 13C, the zoom lens according to the seventh embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the object side to an intermediate position and then toward the image side from the intermediate position, the aperture stop S moves toward the object side, the third lens group G3 moves toward the object side, and the fourth lens group G4 moves toward the image side. Since the amount of movement of the second lens group G2 as it moves to the intermediate position and the amount of movement of the fourth lens group as it moves to the intermediate position are very small, it can be said that they are substantially stationary.

The following seven surfaces are aspheric surfaces: the image side surface of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and the image side surface of the biconvex positive lens L9 in the fourth lens group G4.

Figure 15A:
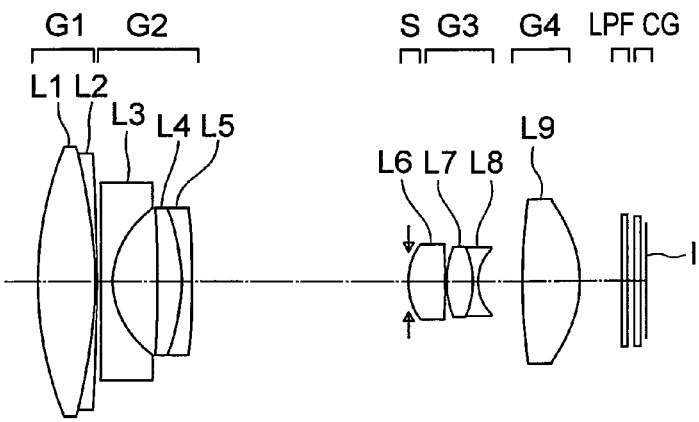
FIGS. 15A, 15B, and 15C are cross sectional views along the optical axis showing the optical configuration of the zoom lens according to the eighth embodiment of the present invention in the state in which the zoom lens is focused at an object point at infinity, where
Figure 15B:
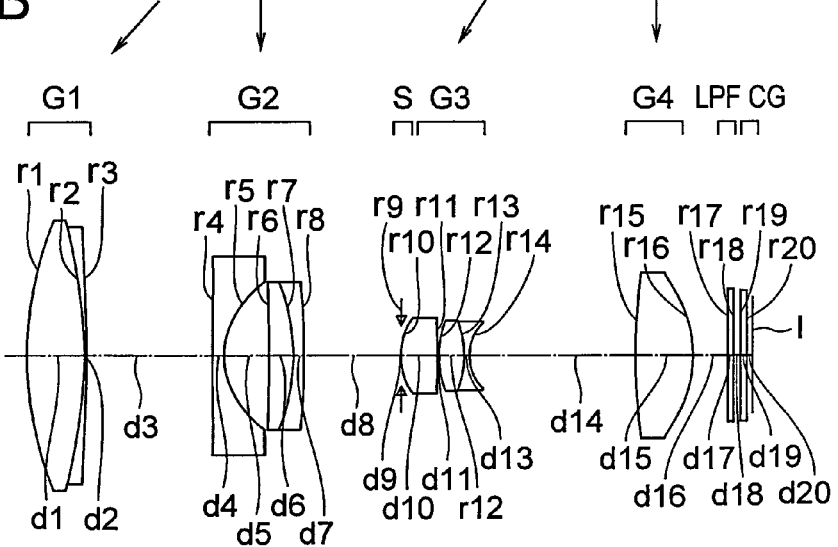
Figure 15C:
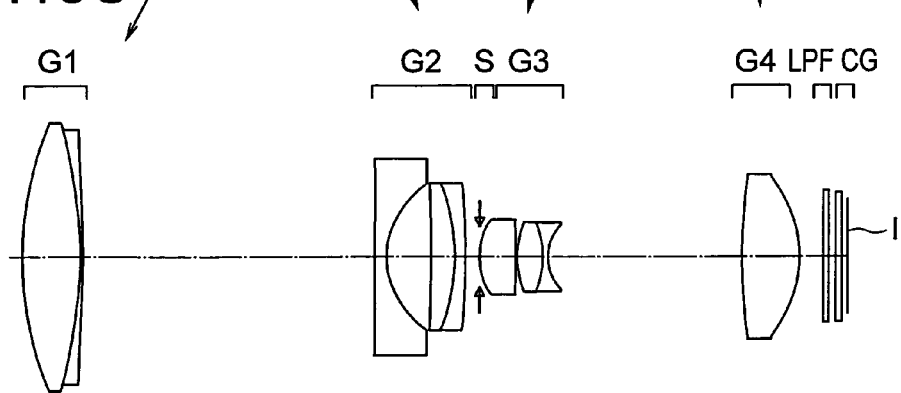

A zoom lens according to an eighth embodiment will be described. FIGS. 15A, 15B, and 15C are cross sectional views along the optical axis showing the optical configuration of the zoom lens according to the eighth embodiment in the state in which the zoom lens is focused at an object point at infinity, where FIG. 15A is a cross sectional view of the zoom lens at the wide angle end, FIG. 15B is a cross sectional view of the zoom lens in an intermediate focal length state, and FIG. 15C is a cross sectional view of the zoom lens at the telephoto end.

Figure 16A:
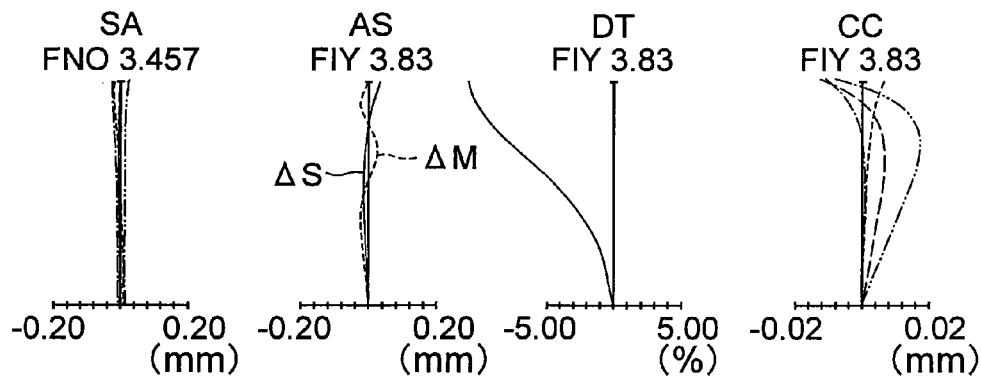
FIGS. 16A, 16B, and 16C are diagrams showing spherical aberration, astigmatism, distortion, and chromatic aberration of magnification (CC) of the zoom lens according to the eighth embodiment in the state in which the zoom lens is focused on an object point at infinity, where
Figure 16B:
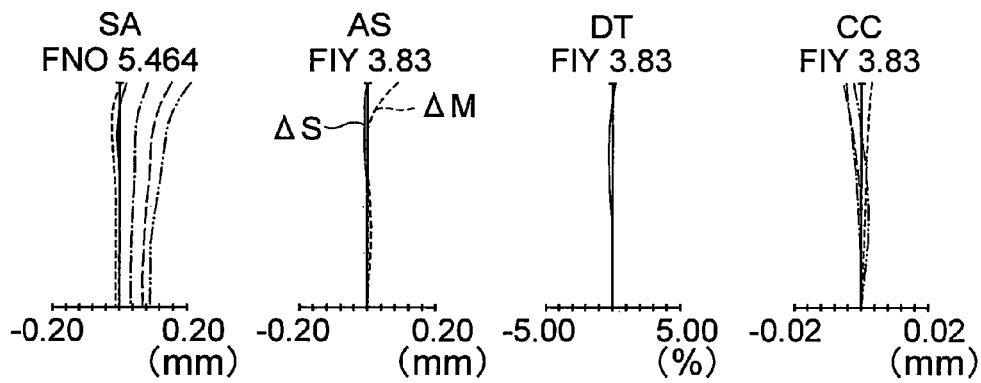
Figure 16C:
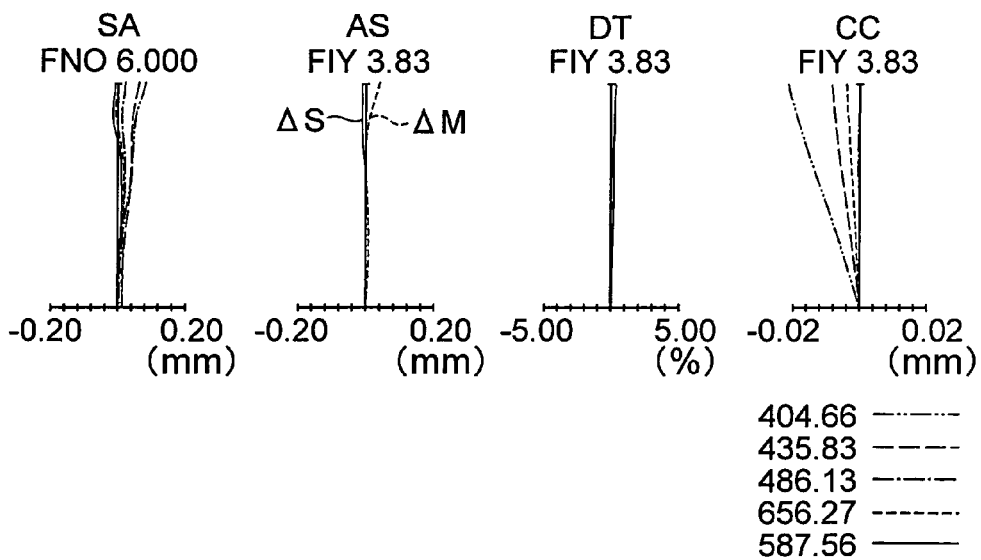

FIGS. 16A, 16B, and 16C are diagrams showing spherical aberration (SA), astigmatism (AS), distortion (DT), and chromatic aberration of magnification (CC) of the zoom lens according to the first embodiment in the state in which the zoom lens is focused on an object point at infinity, where FIG. 16A shows aberrations at the wide angle end, FIG. 16B shows aberrations in the intermediate focal length state, and FIG. 16C shows aberrations at the telephoto end.

As shown in FIGS. 15A to 15C, the zoom lens according to the eighth embodiment includes, in order from the object side thereof, a first lens group G1 having a positive refracting power, a second lens group G2 having a negative refracting power, an aperture stop S, a third lens group G3 having a positive refracting power, and a fourth lens group G4 having a positive refracting power.

The first lens group G1 is composed of a cemented lens made up of a biconvex positive lens L1 and a negative meniscus lens L2 having a convex surface directed toward the image side, and has a positive refracting power as a whole.

The second lens group G2 is composed of a negative meniscus lens L3 having a convex surface directed toward the object side, and a cemented lens made up of a positive meniscus lens L4 having a convex surface directed toward the image side and a biconcave negative lens L5, and has a negative refracting power as a whole.

The third lens group G3 is composed of a biconvex positive lens L6, and a cemented lens made up of a biconvex positive lens L7 and a biconcave negative lens L8, and has a positive refracting power as a whole.

The fourth lens group G4 is composed of a biconvex positive lens L9, and has a positive refracting power as a whole.

During zooming from the wide angle end to the telephoto end, the first lens group G1 moves toward the object side, the second lens group G2 moves toward the image side, the aperture stop S moves toward the object side, the third lens group G3 moves toward the object side, and the fourth lens group G4 moves toward the image side. Since the amount of movement of the second lens group G2 as it moves to the intermediate position is very small, it can be said that it is substantially stationary.

The following nine surfaces are aspheric surfaces: both surfaces of the negative meniscus lens L2 having a convex surface directed toward the image side in the first lens group G1, both surfaces of the negative meniscus lens L3 having a convex surface directed toward the object side and the image side surface of the biconcave negative lens L5 in the second lens group G2, both surfaces of the biconvex positive lens L6 in the third lens group G3, and both surfaces of the biconvex positive lens L9 in the fourth lens group G4.

Although all the zoom lenses according to the embodiments are zoom optical systems, the present invention is not limited to zoom optical systems but it may be applied to fixed focal length lenses. When applied, in particular, to zoom optical systems, the present invention will provide more advantageous and desirable effects.

Numerical data of each embodiment described above is shown below. In numerical data of each embodiment, r denotes radius of curvature of each lens surface, d denotes a thickness or a air distance of each lens, nd1 denotes a refractive index of each lens for a d-line, vd denotes an Abbe's number for each lens, $F_{NO}$ denotes an F number, f denotes a focal length of the entire zoom lens system, 2ω denotes an entire angle of field, BF denotes a back focus. Further, "*" affixed to surface number denotes an aspheric surface.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}$$

where, r denotes a paraxial radius of curvature, K denotes a conical coefficient, A4, A6, A8, and A10 denote aspherical surface coefficients of a fourth order, a sixth order, an eight order, a tenth order, and a twelfth order respectively. Moreover, in the aspherical surface coefficients, 'E-n' (where, n is an integral number) indicates '$10^{-n}$'.

Further, these signs in specific data are common to after-mentioned numerical data of embodiment.

Example 1 unit mm
Surface data

| Surface no. | r | d | nd | vd | effective radius |
|---|---|---|---|---|---|
| object plane | ∞ | ∞ | | | |
| 1 | 38.7462 | 3.8780 | 1.74320 | 49.34 | 8.300 |
| 2 | −30.5842 | 0.1001 | 1.63387 | 23.38 | 8.047 |
| 3* | −167.1523 | Variable | | | 7.882 |
| 4* | 331.7471 | 0.8000 | 1.85135 | 40.10 | 5.961 |
| 5* | 6.5610 | 2.7714 | | | 4.691 |
| 6 | −98.0412 | 1.3706 | 1.94595 | 17.98 | 4.600 |
| 7 | −14.2755 | 0.7000 | 1.74320 | 49.34 | 4.586 |
| 8* | 118.5805 | Variable | | | 4.502 |
| 9(S) | ∞ | 0. | | | 2.238 |
| 10* | 4.7451 | 2.3450 | 1.59201 | 67.02 | 2.400 |
| 11* | −22.1177 | 0.1010 | | | 2.309 |
| 12 | 6.4853 | 1.6679 | 1.49700 | 81.54 | 2.263 |
| 13 | −6.8834 | 0.5720 | 1.62004 | 36.26 | 2.102 |
| 14 | 3.2387 | Variable | | | 1.900 |
| 15* | 21.9061 | 2.9450 | 1.52542 | 55.78 | 5.011 |
| 16* | −13.2508 | Variable | | | 5.119 |
| 17 | ∞ | 0.4000 | 1.51633 | 64.14 | 4.312 |
| 18 | ∞ | 0.5000 | | | 4.274 |
| 19 | ∞ | 0.5000 | 1.51633 | 64.14 | 4.207 |
| 20 | ∞ | Variable | | | 4.164 |
| Image plane | ∞ | | | | |

Aspherical surface data

3rd surface

K = 0
A4 = 7.1261E−06, A6 = −9.5994E−11, A8 = 2.8435E−10,
A10 = −3.3886E−12

4th surface

K = 0
A4 = −2.2711E−04, A6 = 1.6054E−05, A8 = −7.9231E−07,
A10 = 1.7115E−08, A12 = −1.4630E−10

5th surface

K = 0
A4 = 7.4976E−06, A6 = 1.9171E−05, A8 = −2.5872E−07,
A10 = 1.4664E−09, A12 = −1.1648E−09

8th surface

K = 0
A4 = −3.9092E−04, A6 = −4.5615E−06, A8 = −1.9641E−07,
A10 = 1.1959E−08, A12 = 2.3141E−10

-continued

10th surface

K = 0
A4 = −3.5333E−04, A6 = 2.1251E−05, A8 = 2.3517E−09,
A10 = 7.4353E−07, A12 = −1.0754E−08
11th surface K = 0
A4 = 1.0797E−03, A6 = 6.3243E−05, A8 = −1.0480E−07,
A10 = 1.6437E−06, A12 = −4.0748E−08
15th surface K = 0.1753
A4 = 2.4585E−04, A6 = −4.0236E−06, A8 = −1.6021E−07
16th surface

K = −12.8225
A4 = 3.7539E−06, A6 = −1.4288E−05, A8 = 6.8251E−08

Zoom data
Zoom ratio 9.6408

|  | Wide angle | Intermediate | Telephoto |
|---|---|---|---|
| f | 5.04205 | 15.62612 | 48.60930 |
| Fno. | 2.91490 | 5.05867 | 6.00000 |
| 2ω(°) | 80.70 | 26.92 | 8.86 |
| Image height | 3.83000 | 3.83000 | 3.83000 |
| Lens total length | 38.15640 | 46.99177 | 57.74277 |
| BF | 4.89017 | 2.89599 | 4.08258 |
| Entrance pupil position | 10.44122 | 23.91418 | 68.14399 |
| Exit pupil position | −13.28680 | −577.87906 | 82.97440 |
| d3 | 0.30000 | 7.89933 | 19.56758 |
| d8 | 13.56406 | 6.42475 | 0.20022 |
| d14 | 2.15124 | 12.52076 | 16.64146 |
| d16 | 3.41026 | 1.38767 | 2.55974 |
| d20 | 0.38637 | 0.41478 | 0.42930 |

Single lens data

| Lens no. | Lens surface | f |
|---|---|---|
| 1 | 1-2 | 23.5602 |
| 2 | 2-3 | −59.0721 |
| 3 | 4-5 | −7.8710 |
| 4 | 6-7 | 17.5237 |
| 5 | 7-8 | −17.1058 |
| 6 | 10-11 | 6.8209 |
| 7 | 12-13 | 7.0091 |
| 8 | 13-14 | −3.4769 |
| 9 | 15-16 | 16.1811 |
| 10 | 17-18 | ∞ |
| 11 | 19-20 | ∞ |

Zoom lens group data

| Group | Initial surface | focal length |
|---|---|---|
| 1 | 1 | 38.12656 |
| 2 | 4 | −7.75907 |
| 3 | 9 | 9.78868 |
| 4 | 15 | 16.18105 |

Example 2 unit mm
Surface data

| Surface no. | r | d | nd | vd | effective radius |
|---|---|---|---|---|---|
| object plane | ∞ | ∞ | | | |
| 1 | 37.6256 | 3.8459 | 1.74320 | 49.34 | 8.300 |
| 2* | −24.3421 | 0.1175 | 1.63387 | 23.38 | 8.057 |
| 3* | −160.7510 | Variable | | | 7.889 |
| 4* | 443.0467 | 0.8000 | 1.85135 | 40.10 | 5.976 |
| 5* | 6.3421 | 2.9963 | | | 4.552 |
| 6 | −99.7376 | 1.3794 | 1.94595 | 17.98 | 4.500 |
| 7 | −13.5019 | 0.7000 | 1.74320 | 49.34 | 4.506 |
| 8* | 96.0909 | Variable | | | 4.462 |
| 9(S) | ∞ | 0. | | | 2.534 |
| 10* | 4.7283 | 2.4785 | 1.59201 | 67.02 | 2.700 |
| 11* | −24.4763 | 0.1010 | | | 2.560 |
| 12 | 6.6975 | 1.7002 | 1.49700 | 81.54 | 2.519 |
| 13 | −8.0759 | 0.5676 | 1.62004 | 36.26 | 2.369 |
| 14 | 3.3152 | Variable | | | 2.137 |
| 15* | 22.6097 | 2.8426 | 1.52542 | 55.78 | 5.007 |
| 16* | −14.3688 | Variable | | | 5.061 |
| 17 | ∞ | 0.4000 | 1.51633 | 64.14 | 4.349 |
| 18 | ∞ | 0.5000 | | | 4.313 |
| 19 | ∞ | 0.5000 | 1.51633 | 64.14 | 4.245 |
| 20 | ∞ | Variable | | | 4.201 |
| Image plane | ∞ | | | | |

Aspherical surface data

2nd surface

K = 0
A4 = 2.7132E−05, A6 = 4.4733E−07, A8 = 1.5703E−11
3rd surface

K = 0
A4 = 4.9319E−06, A6 = −6.6642E−08, A8 = −3.1944E−10,
A10 = 4.7054E−14
4th surface K = 0
A4 = −1.3518E−04, A6 = 1.9930E−06, A8 = −2.7242E−08,
A10 = 1.0017E−10, A12 = −2.6870E−13
5th surface K = 0
A4 = 1.3274E−04, A6 = −1.9445E−06, A8 = 7.4692E−07,
A10 = −1.8659E−08, A12 = −2.6362E−10
8th surface K = 0
A4 = −4.0904E−04, A6 = −1.6552E−06, A8 = −3.2443E−07,
A10 = 2.0395E−08, A12 = −4.0672E−10
10th surface K = 0
A4 = −4.0203E−04, A6 = 8.3604E−05, A8 = −3.0703E−06,
A10 = 1.6765E−09, A12 = 6.5791E−08
11th surface K = 0
A4 = 1.1493E−03, A6 = 1.6702E−04, A8 = 1.6150E−07,
A10 = −1.7725E−06, A12 = 3.4641E−07
15th surface K = 2.2323
A4 = 1.1897E−04, A6 = −1.3050E−06, A8 = −6.0952E−08
16th surface

K = −1.4366
A4 = 4.9634E−04, A6 = −3.0197E−05, A8 = 4.7407E−07

Zoom data
Zoom ratio 9.6374

|  | Wide angle | Intermediate | Telephoto |
|---|---|---|---|
| f | 5.04248 | 15.62724 | 48.59655 |
| Fno. | 2.65542 | 4.67023 | 6.00000 |
| 2ω(°) | 80.70 | 26.96 | 8.87 |
| Image height | 3.83000 | 3.83000 | 3.83000 |
| Lens total length | 38.69447 | 46.78900 | 57.75537 |
| BF | 4.80897 | 2.53923 | 2.70786 |
| Entrance pupil position | 10.34364 | 22.40600 | 61.91793 |
| Exit pupil position | −13.73124 | −359.52622 | 72.84104 |
| d3 | 0.30000 | 7.09563 | 17.55550 |
| d8 | 13.55830 | 6.45549 | 0.97647 |
| d14 | 2.49810 | 13.16957 | 18.98645 |

-continued

| | | | |
|---|---|---|---|
| d16 | 3.32887 | 1.02939 | 1.17246 |
| d20 | 0.38657 | 0.41629 | 0.44186 |

Single lens data

| Lens no. | Lens surface | f |
|---|---|---|
| 1 | 1-2 | 20.4276 |
| 2 | 2-3 | -45.2703 |
| 3 | 4-5 | -7.5640 |
| 4 | 6-7 | 16.3808 |
| 5 | 7-8 | -15.8858 |
| 6 | 10-11 | 6.9119 |
| 7 | 12-13 | 7.6593 |
| 8 | 13-14 | -3.7197 |
| 9 | 15-16 | 17.1757 |
| 10 | 17-18 | ∞ |
| 11 | 19-20 | ∞ |

Zoom lens group data

| Group | Initial surface | focal length |
|---|---|---|
| 1 | 1 | 35.95496 |
| 2 | 4 | -7.41239 |
| 3 | 9 | 9.71529 |
| 4 | 15 | 17.17568 |

Example 3 unit mm
Surface data

| Surface no. | r | d | nd | νd | effective radius |
|---|---|---|---|---|---|
| object plane | ∞ | ∞ | | | |
| 1 | 33.5637 | 3.8561 | 1.74320 | 49.34 | 8.300 |
| 2* | -23.6751 | 0.1010 | 1.63419 | 23.39 | 8.055 |
| 3* | -177.9248 | Variable | | | 7.871 |
| 4* | 351.6671 | 0.8000 | 1.85135 | 40.10 | 5.888 |
| 5* | 6.2223 | 2.8748 | | | 4.524 |
| 6 | -221.5865 | 1.4049 | 1.94595 | 17.98 | 4.400 |
| 7 | -14.0404 | 0.7000 | 1.74320 | 49.34 | 4.378 |
| 8* | 48.2566 | Variable | | | 4.275 |
| 9(S) | ∞ | 0. | | | 2.336 |
| 10* | 5.2429 | 4.1608 | 1.59201 | 67.02 | 2.450 |
| 11* | -30.5958 | 0.1010 | | | 2.365 |
| 12 | 5.8118 | 1.2779 | 1.49700 | 81.54 | 2.350 |
| 13 | -8.8779 | 0.5434 | 1.62004 | 36.26 | 2.295 |
| 14 | 3.7537 | Variable | | | 2.165 |
| 15* | 22.6097 | 2.6205 | 1.52542 | 55.78 | 5.056 |
| 16* | -14.3688 | Variable | | | 5.105 |
| 17 | ∞ | 0.4000 | 1.51633 | 64.14 | 4.350 |
| 18 | ∞ | 0.5000 | | | 4.316 |
| 19 | ∞ | 0.5000 | 1.51633 | 64.14 | 4.251 |
| 20 | ∞ | Variable | | | 4.208 |
| Image plane | ∞ | | | | |

Aspherical surface data

2nd surface

K = 0
A4 = 2.5867E-05, A6 = -1.6267E-07, A8 = 1.0628E-08
3rd surface

K = 0
A4 = 6.6904E-06, A6 = 6.3210E-08, A8 = -2.6115E-09
4th surface

K = 0
A4 = -5.2193E-05, A6 = -7.4029E-06, A8 = 1.8920E-07,
A10 = -1.3669E-09

5th surface

K = 0
A4 = 2.1987E-04, A6 = -5.5666E-06, A8 = -3.3971E-07
8th surface

K = 0
A4 = -4.6053E-04, A6 = -3.8234E-06, A8 = 1.6434E-07
10th surface

K = 0
A4 = -2.5237E-04, A6 = -5.6791E-06, A8 = 1.1821E-06
11th surface

K = 0
A4 = 1.1628E-03, A6 = 1.6702E-04, A8 = 5.7620E-06
15th surface

K = 2.2323
A4 = 1.1897E-04, A6 = -1.3050E-06, A8 = -6.0952E-08
16th surface

K = -1.4366,
A4 = 4.9634E-04, A6 = -3.0197E-05, A8 = 4.7407E-07

Zoom data
Zoom ratio 9.6416

| | Wide angle | Intermediate | Telephoto |
|---|---|---|---|
| f | 5.04220 | 15.62797 | 48.61484 |
| Fno. | 2.85743 | 4.81962 | 5.99414 |
| 2ω(°) | 80.70 | 26.79 | 8.86 |
| Image height | 3.83000 | 3.83000 | 3.83000 |
| Lens total length | 39.43235 | 48.80462 | 57.73602 |
| BF | 5.47663 | 3.56194 | 3.46182 |
| Entrance pupil position | 10.36699 | 24.73984 | 64.89698 |
| Exit pupil position | -14.38954 | -372.75423 | 78.18348 |
| d3 | 0.30000 | 7.54587 | 16.87792 |
| d8 | 13.20125 | 6.59591 | 0.99905 |
| d14 | 2.01414 | 12.66057 | 17.95691 |
| d16 | 3.99974 | 2.06308 | 1.94683 |
| d20 | 0.38335 | 0.40532 | 0.42145 |

Single lens data

| Lens no. | Lens surface | f |
|---|---|---|
| 1 | 1-2 | 19.2319 |
| 2 | 2-3 | -43.0721 |
| 3 | 4-5 | -7.4484 |
| 4 | 6-7 | 15.7949 |
| 5 | 7-8 | -14.5643 |
| 6 | 10-11 | 7.9017 |
| 7 | 12-13 | 7.2775 |
| 8 | 13-14 | -4.1860 |
| 9 | 15-16 | 17.1393 |
| 10 | 17-18 | ∞ |
| 11 | 19-20 | ∞ |

Zoom lens group data

| Group | Initial surface | focal length |
|---|---|---|
| 1 | 1 | 33.43841 |
| 2 | 4 | -7.02584 |
| 3 | 9 | 9.99048 |
| 4 | 15 | 17.13925 |

Example 4 unit mm
Surface data

| Surface no. | r | d | nd | νd | effective radius |
|---|---|---|---|---|---|
| object plane | ∞ | ∞ | | | |
| 1 | 33.4995 | 3.8549 | 1.74320 | 49.34 | 8.300 |

-continued

| | | | | | |
|---|---|---|---|---|---|
| 2* | −24.0415 | 0.1020 | 1.63408 | 23.39 | 8.054 |
| 3* | −184.2664 | Variable | | | 7.870 |
| 4* | 408.0248 | 0.8000 | 1.85135 | 40.10 | 5.892 |
| 5* | 6.2345 | 2.8693 | | | 4.517 |
| 6 | −226.7782 | 1.3680 | 1.94595 | 17.98 | 4.400 |
| 7 | −13.9046 | 0.7000 | 1.74320 | 49.34 | 4.381 |
| 8* | 48.7621 | Variable | | | 4.283 |
| 9(S) | ∞ | 0. | | | 2.329 |
| 10* | 5.2570 | 4.1685 | 1.59201 | 67.02 | 2.450 |
| 11* | −31.3921 | 0.1010 | | | 2.366 |
| 12 | 5.7722 | 1.2811 | 1.49700 | 81.54 | 2.350 |
| 13 | −8.9679 | 0.5457 | 1.62004 | 36.26 | 2.295 |
| 14 | 3.7552 | Variable | | | 2.165 |
| 15* | 22.6097 | 2.5873 | 1.52542 | 55.78 | 5.056 |
| 16* | −14.3688 | Variable | | | 5.104 |
| 17 | ∞ | 0.4000 | 1.51633 | 64.14 | 4.351 |
| 18 | ∞ | 0.5000 | | | 4.317 |
| 19 | ∞ | 0.5000 | 1.51633 | 64.14 | 4.252 |
| 20 | ∞ | Variable | | | 4.210 |
| Image plane | ∞ | | | | |

Aspherical surface data

2nd surface $K = 0$
$A4 = 2.4255E-05, A6 = -1.6024E-07, A8 = 1.0292E-08$

3rd surface $K = 0$
$A4 = 6.5739E-06, A6 = 6.4429E-08, A8 = -2.5473E-09$

4th surface $K = 0$
$A4 = -4.7468E-05, A6 = -7.0879E-06, A8 = 1.8324E-07,$
$A10 = -1.3494E-09$ 5th surface $K = 0$
$A4 = 2.3209E-04, A6 = -5.5503E-06, A8 = -2.6484E-07$ 8th surface $K = 0$
$A4 = -4.6306E-04, A6 = -3.6484E-06, A8 = 1.3207E-07$ 10th surface $K = 0$
$A4 = -2.4582E-04, A6 = -4.7771E-06, A8 = 1.1377E-06$ 11th surface $K = 0$
$A4 = 1.1581E-03, A6 = 5.9424E-06, A8 = 5.6155E-06$ 15th surface $K = 2.2323$
$A4 = 1.1897E-04, A6 = -1.3050E-06, A8 = -6.0952E-08$ 16th surface $K = -1.4366$
$A4 = 4.9634E-04, A6 = -3.0197E-05, A8 = 4.7407E-07$ Zoom data
Zoom ratio 9.6421

| | Wide angle | Intermediate | Telephoto |
|---|---|---|---|
| f | 5.04198 | 15.62788 | 48.61538 |
| Fno. | 2.86665 | 4.82620 | 6.00000 |
| 2ω(°) | 80.70 | 26.79 | 8.86 |
| Image height | 3.83000 | 3.83000 | 3.83000 |
| Lens total length | 39.46471 | 48.81193 | 57.73565 |
| BF | 5.45719 | 3.52427 | 3.45964 |
| Entrance pupil position | 10.37149 | 24.91621 | 65.14585 |
| Exit pupil position | −14.45593 | −364.85480 | 78.65951 |
| d3 | 0.30000 | 7.62618 | 16.97403 |
| d8 | 13.26587 | 6.63986 | 0.99970 |
| d14 | 2.06373 | 12.64827 | 17.92436 |
| d16 | 3.98036 | 2.02562 | 1.94496 |
| d20 | 0.38329 | 0.40510 | 0.42115 |

Single lens data

| Lens no. | Lens surface | f |
|---|---|---|
| 1 | 1-2 | 19.3867 |
| 2 | 2-3 | −43.6153 |
| 3 | 4-5 | −7.4436 |
| 4 | 6-7 | 15.6106 |
| 5 | 7-8 | −14.4890 |
| 6 | 10-11 | 7.9421 |
| 7 | 12-13 | 7.2760 |
| 8 | 13-14 | −4.1999 |
| 9 | 15-16 | 17.1338 |
| 10 | 17-18 | ∞ |
| 11 | 19-20 | ∞ |

Zoom lens group data

| Group | Initial surface | focal length |
|---|---|---|
| 1 | 1 | 33.59323 |
| 2 | 4 | −7.05101 |
| 3 | 9 | 9.99930 |
| 4 | 15 | 17.13383 |

Example 5 unit mm
Surface data

| Surface no. | r | d | nd | vd | effective radius |
|---|---|---|---|---|---|
| object plane | ∞ | ∞ | | | |
| 1 | 38.8392 | 3.8776 | 1.74320 | 49.34 | 8.300 |
| 2 | −30.5816 | 0.1003 | 1.63399 | 23.39 | 8.047 |
| 3* | −167.1533 | Variable | | | 7.883 |
| 4* | 329.0172 | 0.8000 | 1.85135 | 40.10 | 6.100 |
| 5* | 6.5764 | 2.7790 | | | 4.810 |
| 6 | −97.9563 | 1.3767 | 1.94595 | 17.98 | 4.850 |
| 7 | −14.3002 | 0.7000 | 1.74320 | 49.34 | 4.706 |
| 8* | 118.7316 | Variable | | | 4.579 |
| 9(S) | ∞ | 0. | | | 2.242 |
| 10* | 4.7460 | 2.3447 | 1.59201 | 67.02 | 2.350 |
| 11* | −22.1152 | 0.1010 | | | 2.319 |
| 12 | 6.4846 | 1.6660 | 1.49700 | 81.54 | 2.302 |
| 13 | −6.8683 | 0.5715 | 1.62004 | 36.26 | 2.174 |
| 14 | 3.2402 | Variable | | | 2.004 |
| 15* | 21.9160 | 2.9514 | 1.52542 | 55.78 | 4.994 |
| 16* | −13.2543 | Variable | | | 5.113 |
| 17 | ∞ | 0.4000 | 1.51633 | 64.14 | 4.313 |
| 18 | ∞ | 0.5000 | | | 4.276 |
| 19 | ∞ | 0.5000 | 1.51633 | 64.14 | 4.210 |
| 20 | ∞ | Variable | | | 4.168 |
| Image plane | ∞ | | | | |

Aspherical surface data

2nd surface $K = 0$
$A4 = 2.4255E-05, A6 = -1.6024E-07, A8 = 1.0292E-08$

3rd surface $K = 0$
$A4 = 7.0692E-06, A6 = -7.0296E-11, A8 = 2.8247E-10,$
$A10 = -3.3634E-12$ 4th surface $K = 0$
$A4 = -2.2158E-04, A6 = 1.5111E-05, A8 = -7.2165E-07,$
$A10 = 1.5107E-08, A12 = -1.2600E-10$ -continued 5th surface K = 0
A4 = 1.7090E−05, A6 = 1.7653E−05, A8 = −1.7011E−07,
A10 = 1.7201E−09, A12 = −1.1848E−09
8th surface K = 0
A4 = −3.9027E−04, A6 = −4.2746E−06, A8 = −2.0925E−07,
A10 = 1.1892E−08, A12 = 2.1801E−10
10th surface K = 0
A4 = −3.4649E−04, A6 = 2.1064E−05, A8 = 1.5810E−09,
A10 = 7.0622E−07, A12 = −5.8766E−09
11th surface K = 0
A4 = 1.0885E−03, A6 = 6.2072E−05, A8 = −1.0400E−07,
A10 = 1.5818E−06, A12 = −2.9358E−08
15th surface K = 0.2108
A4 = 2.3022E−04, A6 = −4.0382E−06, A8 = −1.7950E−07
16th surface

K = −12.6934
A4 = 4.3373E−06, A6 = −1.5709E−05, A8 = 8.3094E−08

Zoom data
Zoom ratio 9.6407

| | Wide angle | Intermediate | Telephoto |
|---|---|---|---|
| f | 5.04205 | 15.62604 | 48.60895 |
| Fno. | 2.90925 | 5.05429 | 6.00000 |
| 2ω(°) | 80.70 | 26.92 | 8.86 |
| Image height | 3.83000 | 3.83000 | 3.83000 |
| Lens total length | 38.20171 | 47.01914 | 57.74305 |
| BF | 4.87698 | 2.79519 | 4.00499 |
| Entrance pupil position | 10.45598 | 24.01559 | 68.15408 |
| Exit pupil position | −13.30843 | −612.61660 | 82.58418 |
| d3 | 0.30000 | 7.93153 | 19.58684 |
| d8 | 13.59226 | 6.47536 | 0.21040 |
| d14 | 2.16430 | 12.54888 | 16.67265 |
| d16 | 3.39705 | 1.28671 | 2.48187 |
| d20 | 0.38638 | 0.41495 | 0.42959 |

Single lens data

| Lens no. | Lens surface | f |
|---|---|---|
| 1 | 1-2 | 23.5833 |
| 2 | 2-3 | −59.0554 |
| 3 | 4-5 | −7.8912 |
| 4 | 6-7 | 17.5611 |
| 5 | 7-8 | −17.1347 |
| 6 | 10-11 | 6.8217 |
| 7 | 12-13 | 7.0012 |
| 8 | 13-14 | −3.4755 |
| 9 | 15-16 | 16.1873 |
| 10 | 17-18 | ∞ |
| 11 | 19-20 | ∞ |

Zoom lens group data

| Group | Initial surface | focal length |
|---|---|---|
| 1 | 1 | 38.19622 |
| 2 | 4 | −7.77672 |
| 3 | 9 | 9.79533 |
| 4 | 15 | 16.18727 |

Example 6 unit mm
Surface data

| Surface no. | r | d | nd | vd | effective radius |
|---|---|---|---|---|---|
| object plane | ∞ | ∞ | | | |
| 1 | 40.5092 | 3.8407 | 1.78800 | 47.37 | 8.300 |
| 2 | −31.3780 | 0.0996 | 1.63387 | 23.38 | 7.705 |
| 3* | −178.3296 | Variable | | | 7.500 |
| 4* | 325.4751 | 0.8000 | 1.85135 | 40.10 | 6.061 |
| 5* | 6.5718 | 2.9145 | | | 4.719 |
| 6 | −94.5898 | 1.4574 | 1.94595 | 17.98 | 4.850 |
| 7 | −15.2329 | 0.7000 | 1.74320 | 49.34 | 4.657 |
| 8* | 118.2346 | Variable | | | 4.590 |
| 9(S) | ∞ | 0. | | | 2.312 |
| 10* | 4.7528 | 2.3618 | 1.59201 | 67.02 | 2.556 |
| 11* | −21.9098 | 0.1010 | | | 2.452 |
| 12 | 6.4631 | 1.6574 | 1.49700 | 81.54 | 2.394 |
| 13 | −6.7779 | 0.5689 | 1.62004 | 36.26 | 2.239 |
| 14 | 3.2368 | Variable | | | 2.000 |
| 15* | 20.7709 | 3.1434 | 1.52542 | 55.78 | 4.794 |
| 16* | −13.8253 | Variable | | | 5.000 |
| 17 | ∞ | 0.4000 | 1.51633 | 64.14 | 4.302 |
| 18 | ∞ | 0.5000 | | | 4.264 |
| 19 | ∞ | 0.5000 | 1.51633 | 64.14 | 4.209 |
| 20 | ∞ | Variable | | | 4.180 |
| Image plane | ∞ | | | | |

Aspherical surface data

3rd surface

K = 0
A4 = 8.3809E−06, A6 = 1.1954E−08, A8 = 7.4863E−11,
A10 = −2.0898E−12
4th surface K = 0
A4 = −2.8582E−04, A6 = 1.5960E−05, A8 = −5.1652E−07,
A10 = 7.2923E−09,
A12 = −4.1716E−11
5th surface K = 0
A4 = −2.6296E−05, A6 = 3.2055E−06, A8 = 1.0291E−06,
A10 = −1.2688E−08,
A12 = −1.2986E−09
8th surface K = 0
A4 = −4.0466E−04, A6 = 3.9510E−06, A8 = −8.1664E−07,
A10 = 2.8866E−08,
A12 = −5.7841E−11
10th surface K = 0
A4 = −2.7296E−04, A6 = 1.5915E−05, A8 = −7.9974E−08,
A10 = 4.8361E−07,
A12 = 2.0810E−08
11th surface K = 0
A4 = 1.2100E−03, A6 = 4.9644E−05, A8 = −2.6834E−06,
A10 = 1.7408E−06,
A12 = −5.0032E−10
第15面

K = −1.2413
A4 = 2.4587E−04, A6 = 6.1111E−06, A8 = −1.0328E−06
第16面

K = −20.6197
A4 = −2.7845E−04, A6 = −2.6018E−07, A8 = −7.4384E−07

-continued

Zoom data
Zoom ratio 9.6396

|  | Wide angle | Intermediate | Telephoto |
|---|---|---|---|
| f | 5.04213 | 15.62558 | 48.60408 |
| Fno. | 2.82526 | 4.97425 | 6.00000 |
| 2ω(°) | 80.70 | 27.16 | 8.98 |
| Image height | 3.83000 | 3.83000 | 3.83000 |
| Lens total length | 38.33092 | 46.66113 | 56.74668 |
| BF | 4.84402 | 2.53037 | 3.45519 |
| Entrance pupil position | 10.41750 | 22.79674 | 63.43826 |
| Exit pupil position | −13.19938 | −973.79747 | 76.27427 |
| d3 | 0.30000 | 7.27085 | 18.21919 |
| d8 | 13.48096 | 6.43344 | 0.21034 |
| d14 | 2.06125 | 12.78717 | 17.21727 |
| d16 | 3.36402 | 1.02045 | 1.92846 |
| d20 | 0.38647 | 0.41639 | 0.43319 |

Single lens data

| Lens no. | Lens surface | f |
|---|---|---|
| 1 | 1-2 | 22.9800 |
| 2 | 2-3 | −60.0882 |
| 3 | 4-5 | −7.8874 |
| 4 | 6-7 | 19.0246 |
| 5 | 7-8 | −18.1166 |
| 6 | 10-11 | 6.8219 |
| 7 | 12-13 | 6.9454 |
| 8 | 13-14 | −3.4579 |
| 9 | 15-16 | 16.3081 |
| 10 | 17-18 | ∞ |
| 11 | 19-20 | ∞ |

Zoom lens group data

| Group | Initial surface | focal length |
|---|---|---|
| 1 | 1 | 36.28457 |
| 2 | 4 | −7.66736 |
| 3 | 9 | 9.81248 |
| 4 | 15 | 16.30813 |

Example 7 unit mm
Surface data

| Surface no. | r | d | nd | vd | effective radius |
|---|---|---|---|---|---|
| object plane | ∞ | ∞ | | | |
| 1 | 27.3932 | 4.2000 | 1.58913 | 61.14 | 9.541 |
| 2 | −35.7876 | 0.1000 | 1.63387 | 23.38 | 9.055 |
| 3* | −98.3276 | Variable | | | 8.800 |
| 4* | 385.0280 | 0.8000 | 1.85135 | 40.10 | 6.582 |
| 5* | 6.6547 | 3.0343 | | | 4.938 |
| 6 | −83.5231 | 1.7176 | 1.94595 | 17.98 | 4.850 |
| 7 | −14.0164 | 0.7000 | 1.74320 | 49.34 | 4.820 |
| 8* | 68.5938 | Variable | | | 4.704 |
| 9(S) | ∞ | 0. | | | 2.012 |
| 10* | 4.7393 | 2.6443 | 1.59201 | 67.02 | 2.117 |
| 11* | −20.9923 | 0.1010 | | | 2.002 |
| 12 | 7.1479 | 1.7543 | 1.49700 | 81.54 | 1.950 |
| 13 | −7.1254 | 0.4187 | 1.62004 | 36.26 | 1.855 |
| 14 | 3.2804 | Variable | | | 1.794 |
| 15 | 23.5029 | 3.5430 | 1.52542 | 55.78 | 4.625 |
| 16* | −10.9882 | Variable | | | 4.750 |
| 17 | ∞ | 0.4000 | 1.51633 | 64.14 | 4.268 |
| 18 | ∞ | 0.5000 | | | 4.226 |
| 19 | ∞ | 0.5000 | 1.51633 | 64.14 | 4.145 |
| 20 | ∞ | Variable | | | 4.101 |
| Image plane | ∞ | | | | |

Aspherical surface data

3rd surface

K = 0
A4 = 6.9253E−06, A6 = −1.5952E−08, A8 = 1.4159E−10,
A10 = −6.5161E−13

4th surface

K = 0
A4 = −2.1138E−05, A6 = 2.2478E−09, A8 = −2.9813E−08,
A10 = 1.7957E−11, A12 = 5.5317E−12

5th surface

K = 0
A4 = 1.7903E−04, A6 = −1.5177E−06, A8 = 1.1439E−06,
A10 = −4.2482E−08, A12 = −6.0356E−12

8th surface

K = 0
A4 = −3.5628E−04, A6 = 1.1734E−08, A8 = −6.7191E−07,
A10 = 3.2115E−08, A12 = −3.0697E−10

10th surface

K = 0
A4 = −4.8237E−04, A6 = −1.0718E−07, A8 = 9.6535E−06,
A10 = −2.4331E−06, A12 = 2.5124E−07

11th surface

K = 0
A4 = 1.0129E−03, A6 = 5.9423E−05, A8 = 1.8540E−06,
A10 = −3.2889E−07, A12 = 8.6254E−08

16th surface

K = 0
A4 = −2.4381E−05

Zoom data
Zoom ratio 9.6227

|  | Wide angle | Intermediate | Telephoto |
|---|---|---|---|
| f | 5.05229 | 15.65132 | 48.61681 |
| Fno. | 3.40153 | 5.28247 | 6.00000 |
| 2ω(°) | 80.70 | 27.42 | 8.98 |
| Image height | 3.83000 | 3.83000 | 3.83000 |
| Lens total length | 40.79522 | 50.78563 | 58.62998 |
| BF | 4.60108 | 4.60225 | 3.40430 |
| Entrance pupil position | 11.23195 | 30.68142 | 94.41822 |
| Exit pupil position | −16.62015 | −11931.47796 | 89.32902 |
| d3 | 0.30000 | 9.64514 | 21.08815 |
| d8 | 14.06974 | 6.46875 | 1.26274 |
| d14 | 2.81117 | 11.05626 | 13.86156 |
| d16 | 3.12073 | 3.10223 | 1.89427 |
| d20 | 0.38681 | 0.40648 | 0.41649 |

Single lens data

| Lens no. | Lens surface | f |
|---|---|---|
| 1 | 1-2 | 27.0032 |
| 2 | 2-3 | −88.8217 |
| 3 | 4-5 | −7.9619 |
| 4 | 6-7 | 17.5939 |
| 5 | 7-8 | −15.6033 |
| 6 | 10-11 | 6.7905 |
| 7 | 12-13 | 7.4851 |
| 8 | 13-14 | −3.5678 |
| 9 | 15-16 | 14.7734 |
| 10 | 17-18 | ∞ |
| 11 | 19-20 | ∞ |

-continued

Zoom lens group data

| Group | Initial surface | focal length |
|---|---|---|
| 1 | 1 | 37.87962 |
| 2 | 4 | −7.33747 |
| 3 | 9 | 10.10424 |
| 4 | 15 | 14.77340 |

Example 8 unit mm
Surface data

| Surface no. | r | d | nd | vd | effective radius |
|---|---|---|---|---|---|
| object plane | ∞ | ∞ | | | |
| 1 | 25.6405 | 4.2000 | 1.58913 | 61.14 | 9.312 |
| 2* | −31.4271 | 0.1000 | 1.63419 | 23.39 | 8.788 |
| 3* | −121.4819 | Variable | | | 8.600 |
| 4* | 466.2770 | 0.8000 | 1.85135 | 40.10 | 6.641 |
| 5* | 6.2001 | 3.1940 | | | 4.899 |
| 6 | −144.1358 | 1.7176 | 1.94595 | 17.98 | 4.850 |
| 7 | −13.9448 | 0.7000 | 1.74320 | 49.34 | 4.844 |
| 8* | 135.0549 | Variable | | | 4.772 |
| 9(S) | ∞ | 0. | | | 2.065 |
| 10* | 4.8621 | 2.6443 | 1.59201 | 67.02 | 2.203 |
| 11* | −21.2524 | 0.1010 | | | 2.133 |
| 12 | 7.3526 | 1.7622 | 1.49700 | 81.54 | 2.094 |
| 13 | −6.1516 | 0.4187 | 1.62004 | 36.26 | 1.978 |
| 14 | 3.4116 | Variable | | | 1.889 |
| 15* | 35.3139 | 4.0519 | 1.52542 | 55.78 | 5.225 |
| 16* | −9.9116 | Variable | | | 5.400 |
| 17 | ∞ | 0.4000 | 1.51633 | 64.14 | 4.257 |
| 18 | ∞ | 0.5000 | | | 4.239 |
| 19 | ∞ | 0.5000 | 1.51633 | 64.14 | 4.207 |
| 20 | ∞ | Variable | | | 4.185 |
| Image plane | ∞ | | | | |

Aspherical surface data

2nd surface

K = 0.1816
A4 = 2.4275E−05, A6 = 1.5552E−07, A8 = −1.2323E−09,
A10 = −5.5582E−14, A12 = −1.5183E−14
3rd surface K = 0
A4 = 8.1025E−06, A6 = 5.0730E−09, A8 = −2.1711E−13,
A10 = −9.2625E−13
4th surface K = 0
A4 = −9.5505E−05, A6 = 3.1085E−06, A8 = −5.6103E−08,
A10 = −4.1540E−12, A12 = 4.9459E−12
5th surface K = 0
A4 = −1.1430E−05, A6 = 4.6127E−06, A8 = 3.1134E−07,
A10 = 9.1662E−09, A12 = −9.5412E−10
8th surface K = 0
A4 = −2.9611E−04, A6 = −4.9393E−06, A8 = −2.1103E−07,
A10 = 1.0337E−08, A12 = −8.2485E−11
10th surface K = 0
A4 = −4.1069E−04, A6 = −4.3482E−06, A8 = 1.2134E−05,
A10 = −2.2848E−06, A12 = 1.8506E−07

11th surface

K = 0
A4 = 8.8913E−04, A6 = 5.0547E−05, A8 = 3.0961E−06,
A10 = −1.0022E−07, A12 = 5.9925E−08
15th surface K = 0
A4 = −3.7979E−04, A6 = 8.7055E−06
16th surface

K = 0
A4 = −4.0106E−04, A6 = 1.1291E−05

Zoom data
Zoom ratio 9.6231

| | Wide angle | Intermediate | Telephoto |
|---|---|---|---|
| f | 5.05222 | 15.64959 | 48.61822 |
| Fno. | 3.45733 | 5.46433 | 6.00000 |
| 2ω(°) | 80.71 | 27.48 | 8.98 |
| Image height | 3.83000 | 3.83000 | 3.83000 |
| Lens total length | 43.13626 | 51.50150 | 58.63074 |
| BF | 4.47762 | 4.08351 | 3.18962 |
| Entrance pupil position | 11.38354 | 28.92685 | 93.04792 |
| Exit pupil position | −18.90604 | 306.57010 | 94.53752 |
| d3 | 0.30000 | 8.95746 | 20.83110 |
| d8 | 15.54135 | 7.00824 | 1.14616 |
| d14 | 3.12752 | 11.76251 | 13.77409 |
| d16 | 2.99646 | 2.58029 | 1.67884 |
| d20 | 0.38762 | 0.40968 | 0.41724 |

Single lens data

| Lens no. | Lens surface | f |
|---|---|---|
| 1 | 1-2 | 24.6402 |
| 2 | 2-3 | −66.8771 |
| 3 | 4-5 | −7.3867 |
| 4 | 6-7 | 16.2166 |
| 5 | 7-8 | −16.9732 |
| 6 | 10-11 | 6.9453 |
| 7 | 12-13 | 7.0443 |
| 8 | 13-14 | −3.4810 |
| 9 | 15-16 | 15.1990 |
| 10 | 17-18 | ∞ |
| 11 | 19-20 | ∞ |

Zoom lens group data

| Group | Initial surface | focal length |
|---|---|---|
| 1 | 1 | 37.69836 |
| 2 | 4 | −7.63637 |
| 3 | 9 | 10.59192 |
| 4 | 15 | 15.19898 |

In the following, numerical values associated with the conditional expressions will be presented for each of the embodiments. Here, conditional expressions (1-1) and (1-2) will be collectively referred to as conditional expression (1), conditional expressions (2-1) and (2-2) will be collectively referred to as conditional expression (2), conditional expressions (3-1) and (3-2) will be collectively referred to as conditional expression (3), conditional expressions (4-1) and (4-2) will be collectively referred to as conditional expression (4), conditional expressions (5-1) and (5-2) will be collectively referred to as conditional expression (5), and conditional expressions (6-1) and (6-2) will be collectively referred to as conditional expression (6).

| Tg1/Flt | θgF | nd1 | vd1 | θhg | nd2 | vd2 |

Expression

|     | (1)    | (2), (5) | (3)     | (4)   | (6)    | (7)     | (8)   |
|-----|--------|----------|---------|-------|--------|---------|-------|
| Ex1 | 0.0818 | 0.6684   | 1.63387 | 23.38 | 0.6351 | 1.74320 | 49.34 |
| Ex2 | 0.0814 | 0.6684   | 1.63387 | 23.38 | 0.6351 | 1.74320 | 49.34 |
| Ex3 | 0.0813 | 0.6103   | 1.63419 | 23.39 | 0.5487 | 1.74320 | 49.34 |
| Ex4 | 0.0813 | 0.6306   | 1.63408 | 23.39 | 0.5825 | 1.74320 | 49.34 |
| Ex5 | 0.0818 | 0.6494   | 1.63399 | 23.39 | 0.6153 | 1.74320 | 49.34 |
| Ex6 | 0.081  | 0.6684   | 1.63387 | 23.38 | 0.6351 | 1.78800 | 47.37 |
| Ex7 | 0.0884 | 0.6684   | 1.63387 | 23.38 | 0.6349 | 1.58913 | 61.14 |
| Ex8 | 0.0884 | 0.6103   | 1.63419 | 23.39 | 0.5486 | 1.58913 | 61.14 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 17:
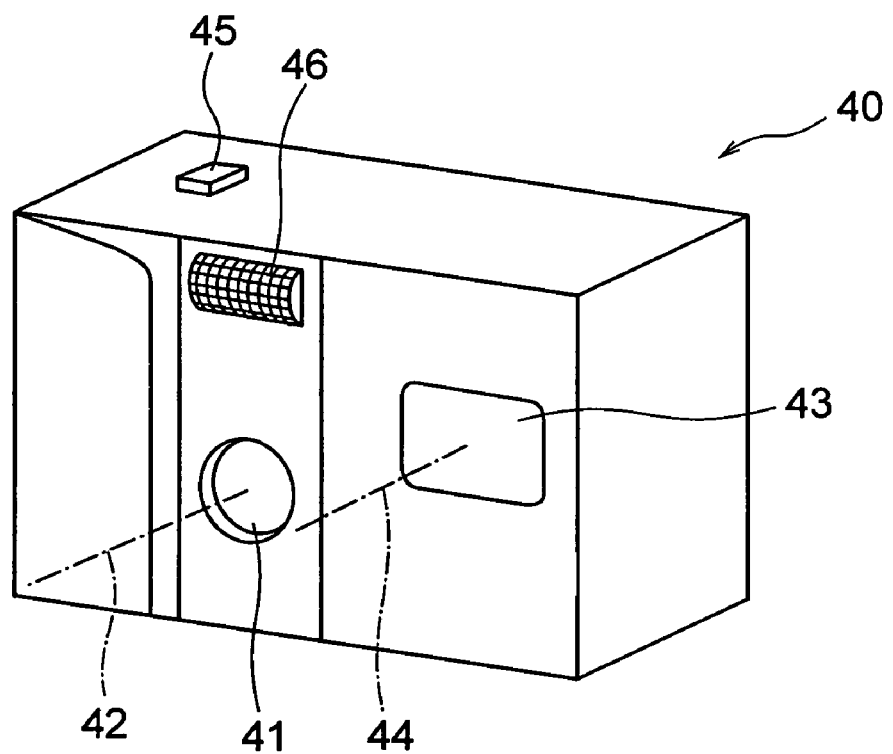
FIG. 17 is a front perspective view showing an outer appearance of a digital camera 40 equipped with a zoom optical system according to the present invention.
Figure 18:
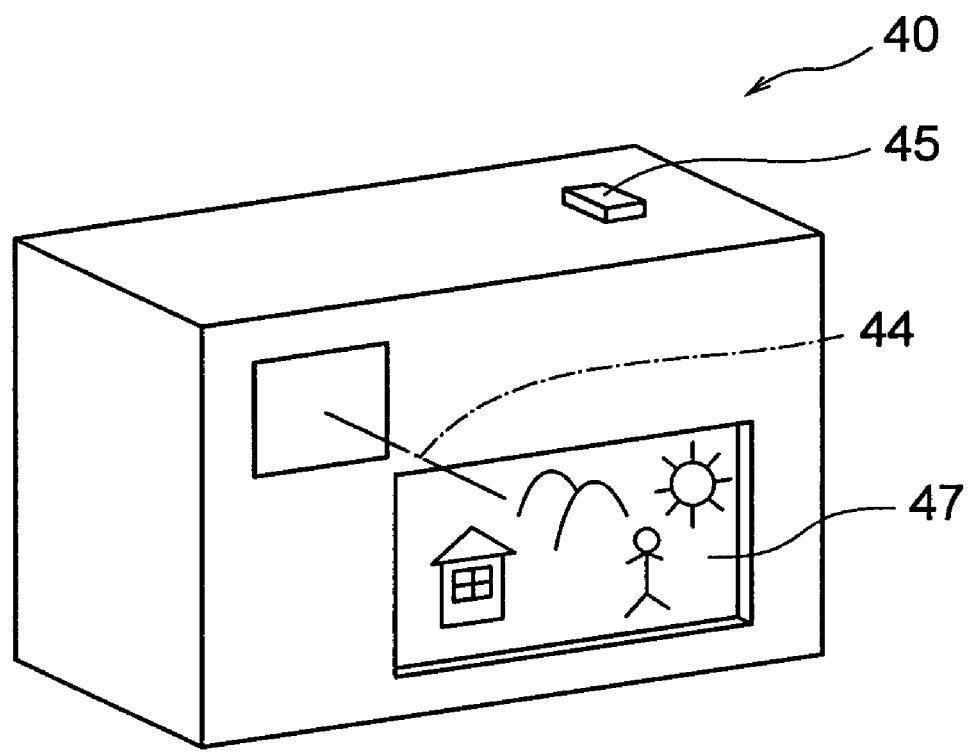
FIG. 18 is a rear perspective view of the digital camera 40.
Figure 19:
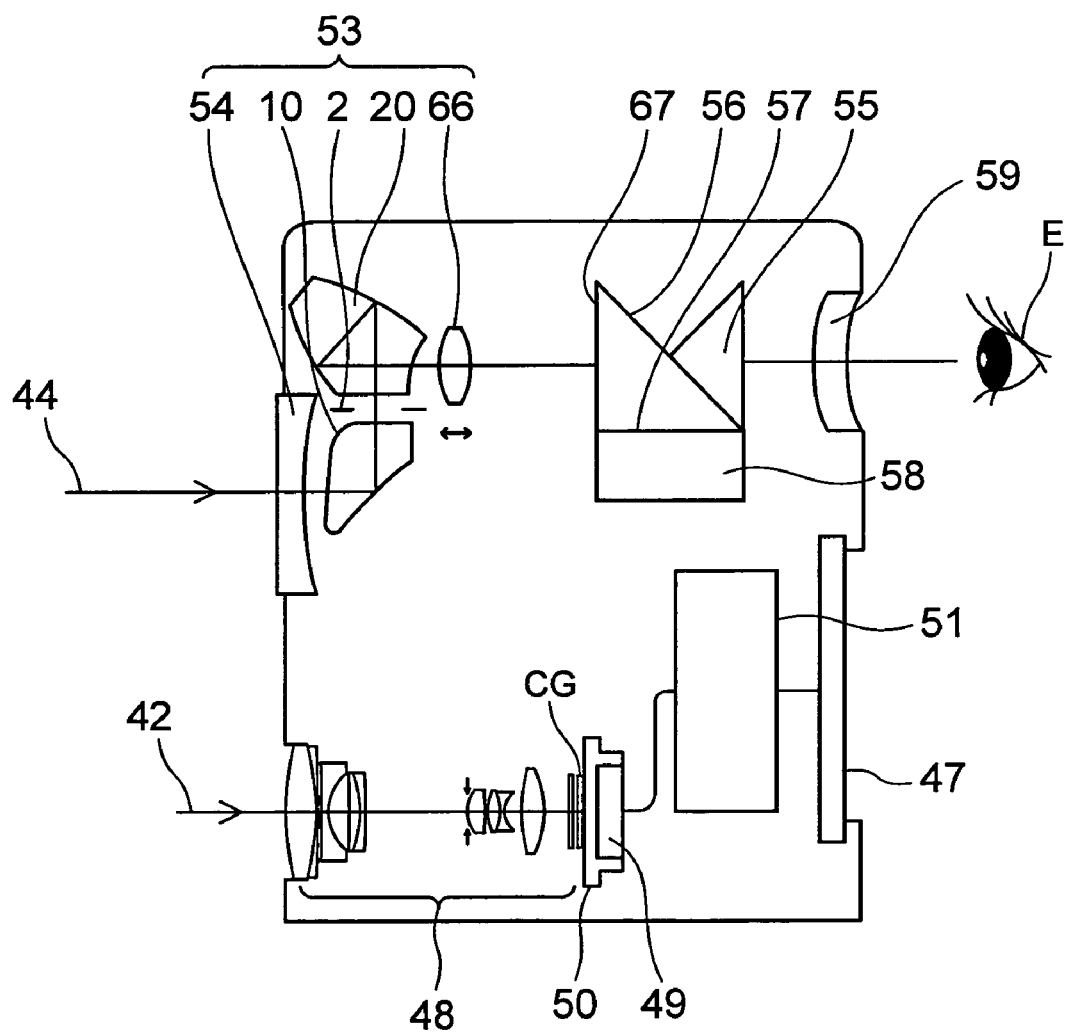
FIG. 19 is a cross sectional view showing the optical construction of the digital camera 40.

In FIG. 17 to FIG. 19 show conceptual diagrams of structures in which the image forming optical system according to the present invention is incorporated in a photographic optical system 41 of a digital camera. FIG. 17 is a frontward perspective view showing an appearance of a digital camera 40, FIG. 18 is a rearward perspective view of the same, and FIG. 19 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 20:
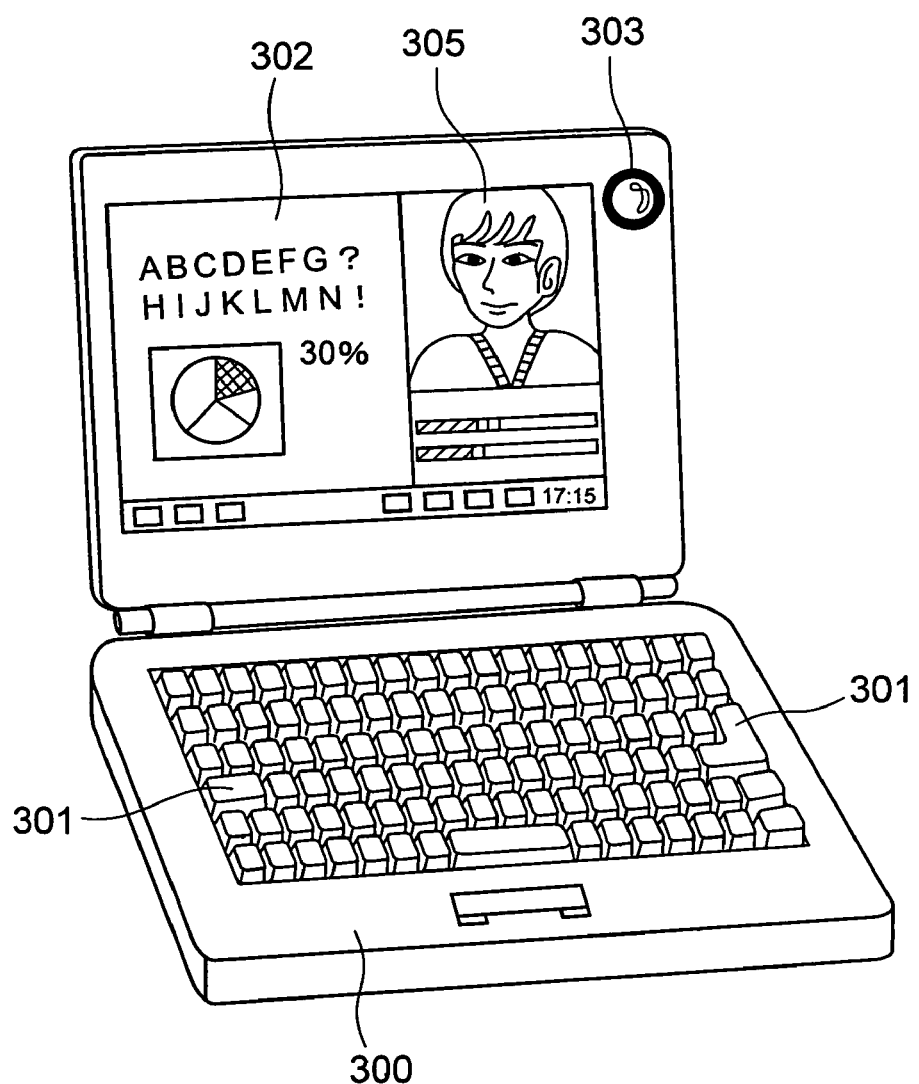
FIG. 20 a front perspective view showing a personal computer 300 as an example of an information processing apparatus in which a zoom optical system according to the present invention is provided as an objective optical system, in a state in which the cover is open.
Figure 21:
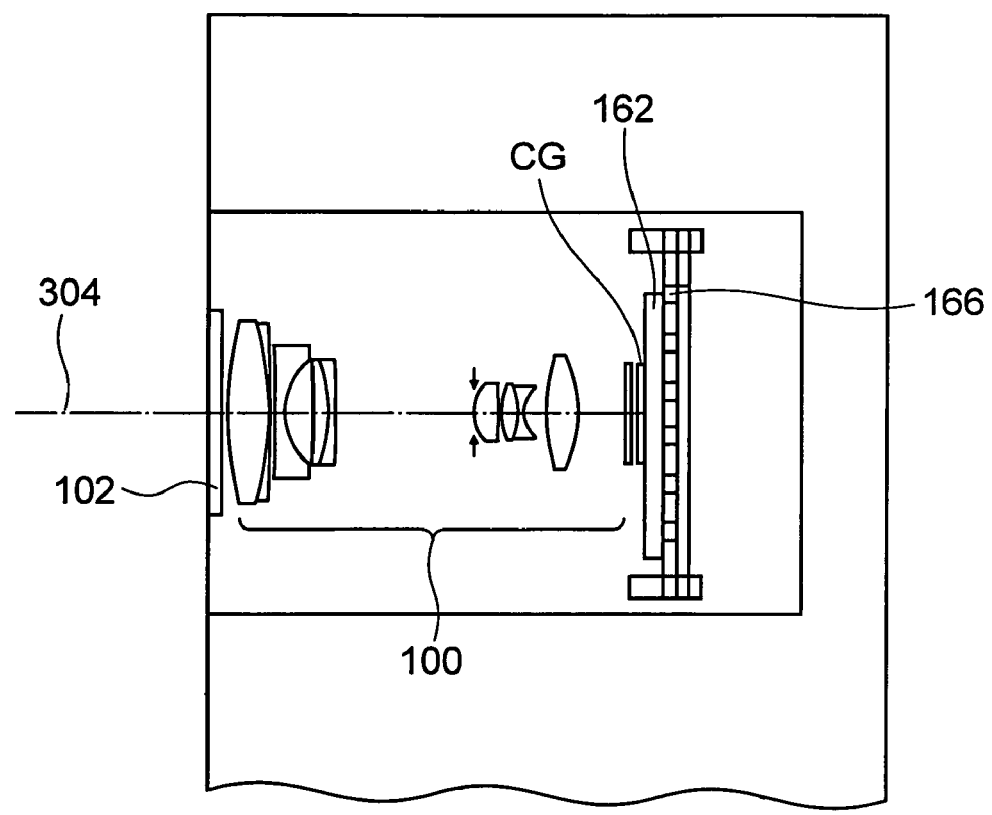
FIG. 21 is a cross sectional view of the image taking optical system 303 of the personal computer 300.
Figure 22:
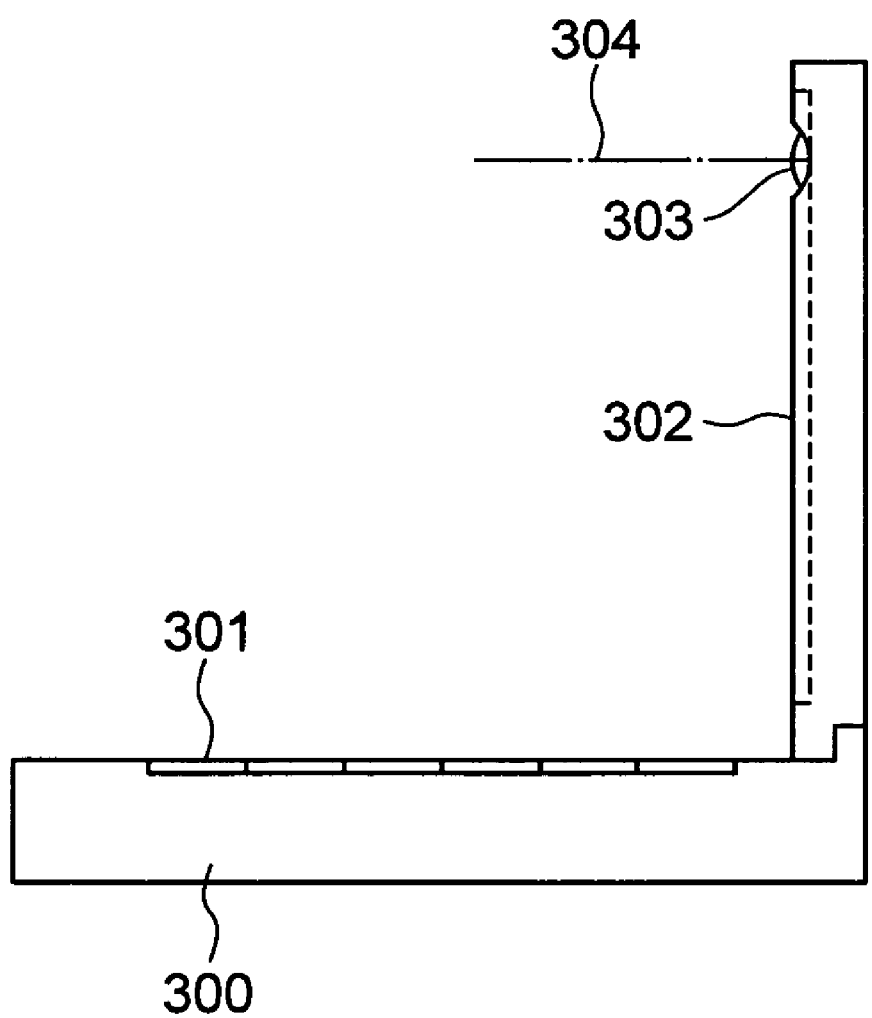
FIG. 22 is a side view of the personal computer 300.

Next, a personal computer which is an example of an information processing apparatus with a built-in image forming system as an objective optical system is shown in FIG. 20 to FIG. 22. FIG. 20 is a frontward perspective view of a personal computer 300 with its cover opened, FIG. 21 is a cross-sectional view of a photographic optical system 303 of the personal computer 300, and FIG. 22 is a side view of FIG. 20. As it is shown in FIG. 80 to FIG. 82, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 20, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 23A:
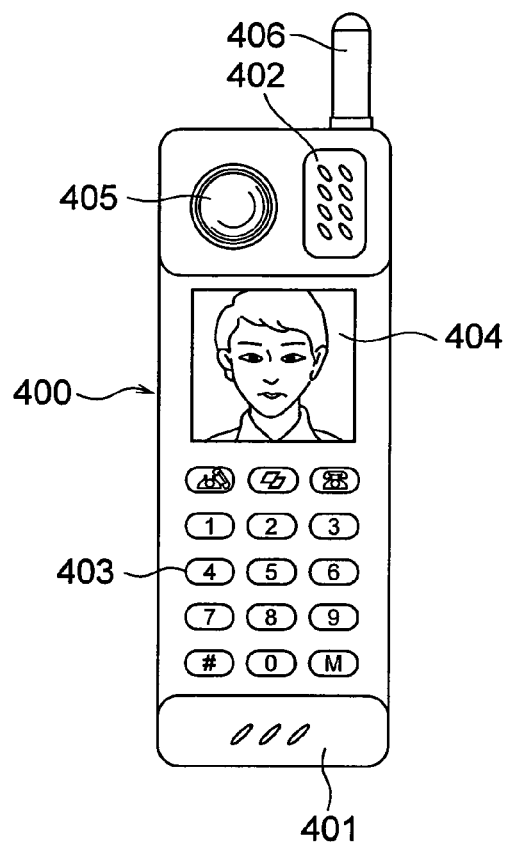
FIGS. 23A, 23B, and 23C show a cellular phone as an example of an information processing apparatus in which a zoom optical system according to the present invention is provided as an image taking optical system, where
Figure 23B:
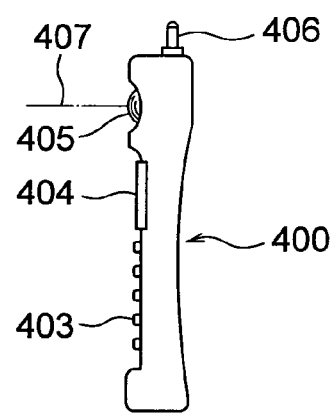
Figure 23C:
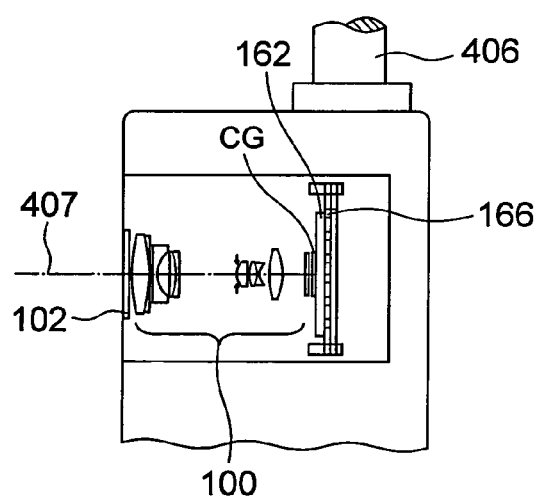

Next, a telephone which is an example of an information processing apparatus in which the image forming optical system of the present invention is built-in as a photographic optical system, particularly a portable telephone which is easy to carry is shown in FIG. 23A, FIG. 23B, and FIG. 23C. FIG. 23A is a front view of a portable telephone 400, FIG. 23B is a side view of the portable telephone 400, and FIG. 23C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

According to the present invention, there can be advantageously provided an image forming optical system with which reduction in the size and thinness of the optical system and good correction of aberrations such as, in particular, chromatic aberrations are both achieved, and an image pickup apparatus equipped with the same.

What is claimed is:

1. An image forming optical system characterized by comprising a positive first lens group, a negative second lens group, and an image side lens group disposed on the image side of the negative second lens group, wherein
the image side lens group has a positive composite refracting power,
the first lens group is composed of a cemented lens made up of one positive lens and one negative lens arranged in order from the object side, and
the image forming optical system satisfies the following conditional expressions (1-1) and (2-1):

$$0.05 < T1g/Flt < 0.10 \quad (1\text{-}1)$$

$$0.50 < \theta gF < 0.75 \quad (2\text{-}1)$$

where T1g is a thickness of the first lens group on the optical axis, Flt is a focal length of the entire image forming optical system at the telephoto end, and θgF is a partial dispersion ratio (ng1−nF1)/(nF1−nC1) of the negative lens, where nC1, nF1, ng1 are refractive indices of the negative lens respectively for the C-line, F-line, and g-line.

2. The image forming optical system according to claim 1, characterized in that the image forming optical system satisfies the following conditional expressions (1-2) and (2-2):

$$0.07 < T1g/Flt < 0.09 \quad (1\text{-}2)$$

$$0.52 < \theta gF < 0.73 \quad (2\text{-}2).$$

3. The image forming optical system according to claim 1, characterized in that the image forming optical system satisfies the following conditional expression (7):

$$1.70 < nd2 < 1.85 \quad (7)$$

where nd2 is a refractive index of the positive lens for the d-line.

4. The image forming optical system according to claim 1, characterized in that the image forming optical system satisfies the following conditional expression (8):

$$55 < vd2 < 75 \quad (8)$$

where νd2 is an Abbe number (nd2−1)/(nF2−nC2) of the positive lens, where nd2, nF2, and nC2 are refractive indices of the positive lens respectively for the d-line, F-line, and C-line.

5. The image forming optical system according to claim 1, characterized in that the second lens group comprises a cemented lens made up of one positive lens and one negative lens arranged in order from the object side.

6. The image forming optical system according to claim 1, characterized in that the image side lens group includes a third lens group, and the third lens group comprises, in order from the object side, one positive lens and a cemented lens made up of one positive lens and one negative lens.

7. An electronic image pickup apparatus characterized by comprising the image forming optical system according to claim 1.

8. The image forming optical system according to claim 1, characterized in that the image forming optical system satisfies the following conditional expressions (3-1) and (4-1):

$$1.50 < nd1 < 1.70 \quad (3\text{-}1)$$

$$16 < vd1 < 28 \quad (4\text{-}1)$$

where nd1 is a refractive index of the negative lens for the d-line, and νd1 is an Abbe number (nd1−1)/(nF1−nC1) of the negative lens, where nC1, and nF1 are refractive indices of the negative lens respectively for the C-line and F-line.

9. The image forming optical system according to claim 8, characterized in that the image forming optical system satisfies the following conditional expressions (3-2) and (4-2):

$$57 < nd1 < 1.67 \quad (3\text{-}2)$$

$$19 < vd1 < 26 \quad (4\text{-}2).$$

10. The image forming optical system according to claim 1, characterized in that the image forming optical system satisfies the following conditional expressions (3-1), (5-1), and (6-1):

$$1.50 < nd1 < 1.70 \quad (3\text{-}1)$$

$$0.54 < \theta gF < 0.72 \quad (5\text{-}1)$$

$$0.51 < \theta hg < 0.68 \quad (6\text{-}1)$$

where nd1 is a refractive index of the negative lens for the d-line, and θgF is a partial dispersion ratio (ng1−nF1)/(nF1−nC1) of the negative lens, θhg is a partial dispersion ratio (nh1−ng1)/(nF1−nC1) of the negative lens, where nF1, nC1, nh1, and ng1 are refractive indices of the negative lens respectively for the F-line, C-line, h-line, and g-line.

11. The image forming optical system according to claim 10, characterized in that the image forming optical system satisfies the following conditional expressions (3-1), (5-2), and (6-2):

$$1.50 < nd1 < 1.70 \quad (3\text{-}1)$$

$$0.645 < \theta gF < 0.68 \quad (5\text{-}2)$$

$$0.605 < \theta hg < 0.645 \quad (6\text{-}2).$$

12. The image forming optical system according to claim 1, characterized in that an interface between the positive lens and the negative lens in the first lens group is an aspheric surface.

13. The image forming optical system according to claim 12, characterized in that the aspheric surface has a shape of which the curvature becomes increasingly smaller as compared to its paraxial curvature farther away from the optical axis.

14. The image forming optical system according to claim 1, characterized in that the negative lens in the first lens group is made of a resin.

15. The image forming optical system according to claim 14, characterized in that the resin is an energy curable resin.

16. The image forming optical system according to claim 15, characterized in that the resin is the ultraviolet curable resin.

17. The image forming optical system according to claim 1, characterized in that the image side lens group includes a rearmost lens group, and the rearmost lens group has a positive refracting power.

18. The image forming optical system according to claim 17, characterized in that focusing is performed by moving the rearmost lens group along the optical axis direction.

19. The image forming optical system according to claim 18, characterized in that the rearmost lens group is composed of one positive lens.

20. The image forming optical system according to claim 18, characterized in that the rearmost lens group is made of a resin.

* * * * *